US012769093B2

(12) United States Patent
Tung et al.

(10) Patent No.: US 12,769,093 B2
(45) Date of Patent: Oct. 20, 2026

(54) OPTICAL IMAGING MODULE, CAMERA MODULE AND ELECTRONIC DEVICE

(71) Applicant: LARGAN PRECISION CO., LTD., Taichung City (TW)

(72) Inventors: Wei-Che Tung, Taichung City (TW); Lin-An Chang, Taichung City (TW); Ssu-Hsin Liu, Taichung City (TW); Wen-Yu Tsai, Taichung City (TW)

(73) Assignee: LARGAN PRECISION CO., LTD., Taichung City (TW)

( * ) Notice: Subject to any disclaimer, the term of this patent is extended or adjusted under 35 U.S.C. 154(b) by 246 days.

(21) Appl. No.: 18/642,955

(22) Filed: Apr. 23, 2024

(65) Prior Publication Data

US 2024/0272406 A1 Aug. 15, 2024

Related U.S. Application Data

(63) Continuation of application No. 18/413,330, filed on Jan. 16, 2024.

(60) Provisional application No. 63/480,111, filed on Jan. 17, 2023.

(30) Foreign Application Priority Data

Sep. 18, 2023 (TW) ................................ 112135457

(51) Int. Cl.
*G02B 13/00* (2006.01)

(52) U.S. Cl.
CPC ................................ *G02B 13/0065* (2013.01)

(58) Field of Classification Search
CPC .............. G02B 13/001; G02B 13/0055; G02B 13/0065; G02B 1/11
USPC .......................................................... 359/726
See application file for complete search history.

(56) References Cited

U.S. PATENT DOCUMENTS

| | | | | |
|---|---|---|---|---|
| 10,082,649 B2 | 9/2018 | Park | | |
| 11,762,174 B2 * | 9/2023 | Saiga | ................ | G02B 13/0035 348/340 |
| 2014/0239206 A1 * | 8/2014 | Namii | .................... | G03B 17/17 250/558 |

(Continued)

FOREIGN PATENT DOCUMENTS

| | | |
|---|---|---|
| CN | 112882137 A | 6/2021 |
| CN | 214409431 U | 10/2021 |

(Continued)

*Primary Examiner* — William R Alexander
(74) *Attorney, Agent, or Firm* — McClure, Qualey & Rodack, LLP

(57) ABSTRACT

An optical imaging module includes an optical imaging lens assembly, a light path folding element and a light blocking element. The optical imaging lens assembly includes at least one optical lens element. The light path folding element has an incident surface, an emitting surface and at least one optical reflecting surface, and the light path folding element is disposed on an image side of the optical imaging lens assembly. The light blocking element is disposed on one of the optical lens element and the light path folding element, and the light blocking element includes an opening hole and a light blocking surface. The light blocking surface has an anti-reflective light blocking membrane layer. A surface of the anti-reflective light blocking membrane layer has a plurality of nanostructures, and the nanostructures are arranged in an irregular form.

15 Claims, 27 Drawing Sheets

(56) References Cited

U.S. PATENT DOCUMENTS

| | | | | |
|---|---|---|---|---|
| 2018/0194619 | A1* | 7/2018 | Greer | B82B 1/005 |
| 2020/0241260 | A1* | 7/2020 | Chou | G02B 1/04 |
| 2021/0067668 | A1* | 3/2021 | Chang | G02B 7/021 |
| 2021/0080706 | A1* | 3/2021 | Lin | G02B 17/008 |
| 2022/0091373 | A1* | 3/2022 | Saiga | G02B 13/0035 |
| 2022/0163706 | A1 | 5/2022 | Feldman | |
| 2022/0294945 | A1* | 9/2022 | Zhao | H04M 1/0264 |
| 2022/0350226 | A1* | 11/2022 | Lee | H04N 23/57 |
| 2022/0373775 | A1 | 11/2022 | Lin | |
| 2023/0121630 | A1* | 4/2023 | Fu | G02B 13/06 359/713 |
| 2023/0204828 | A1 | 6/2023 | Chang et al. | |

FOREIGN PATENT DOCUMENTS

| | | | |
|---|---|---|---|
| CN | 217085377 | U | 7/2022 |
| CN | 217404597 | U | 9/2022 |
| CN | 217406638 | U | 9/2022 |
| TW | I707188 | B | 10/2020 |

* cited by examiner

433

433

8D

1000

OPTICAL IMAGING MODULE, CAMERA MODULE AND ELECTRONIC DEVICE

RELATED APPLICATIONS

The present application is a continuation of U.S. application Ser. No. 18/413,330, filed Jan. 16, 2024, which claims priority to U.S. Provisional Application Ser. No. 63/480,111, filed Jan. 17, 2023, and Taiwan Application Serial Number 112135457, filed Sep. 18, 2023, which are herein incorporated by reference.

BACKGROUND

Technical Field

The present disclosure relates to an optical imaging module and a camera module. More particularly, the present disclosure relates to an optical imaging module and a camera module which are applicable to portable electronic device.

Description of Related Art

In recent years, portable electronic devices have developed rapidly. For example, intelligent electronic devices and tablets have been filled in the lives of modern people, and camera modules and optical imaging modules thereof mounted on portable electronic devices have also prospered. However, as the technology advances, the quality requirements of optical imaging module are becoming higher and higher. Therefore, developing a folding optical imaging module that can reduce the volume of the optical imaging module by the light path folding element has become an important and urgent problem in the industry.

SUMMARY

According to one aspect of the present disclosure, an optical imaging module includes an optical imaging lens assembly, a light path folding element and a light blocking element. The optical imaging lens assembly includes at least one optical lens element. The light path folding element has an incident surface, an emitting surface and at least one optical reflecting surface, and the light path folding element is disposed on an image side of the optical imaging lens assembly. The light blocking element is disposed on one of the at least one optical lens element and the light path folding element, and the light blocking element includes an opening hole and a light blocking surface. The opening hole is corresponded to one of the incident surface and the emitting surface of the light path folding element. The light blocking surface is adjacent to the opening hole, and the light blocking surface has an anti-reflective light blocking membrane layer. A surface of the anti-reflective light blocking membrane layer has a plurality of nanostructures, and the nanostructures are arranged in an irregular form. The light blocking surface is opposite to at least one of the incident surface, the emitting surface and the at least one optical reflecting surface of the light path folding element.

According to another aspect of the present disclosure, an optical imaging module includes an optical imaging lens assembly, a light path folding element and a light blocking element. The optical imaging lens assembly includes at least one optical lens element. The light path folding element has an incident surface, an emitting surface and at least one optical reflecting surface, and the light path folding element is disposed on an image side of the optical imaging lens assembly. The light blocking element is disposed on one of the at least one optical lens element and the light path folding element, and the light blocking element includes a light blocking surface. The light blocking surface is disposed toward the light path folding element, and the light blocking surface has an anti-reflective light blocking membrane layer. A surface of the anti-reflective light blocking membrane layer has a plurality of nanostructures, and the nanostructures are arranged in an irregular form. The light blocking surface is opposite to at least one of the incident surface, the emitting surface and the at least one optical reflecting surface of the light path folding element.

According to another aspect of the present disclosure, a camera module includes the optical imaging module according to the foregoing aspect and an image sensor.

According to another aspect of the present disclosure, an electronic device includes the camera module according to the foregoing aspect.

BRIEF DESCRIPTION OF THE DRAWINGS

The present disclosure can be more fully understood by reading the following detailed description of the embodiment, with reference made to the accompanying drawings as follows.

DETAILED DESCRIPTION

Figure 1A:
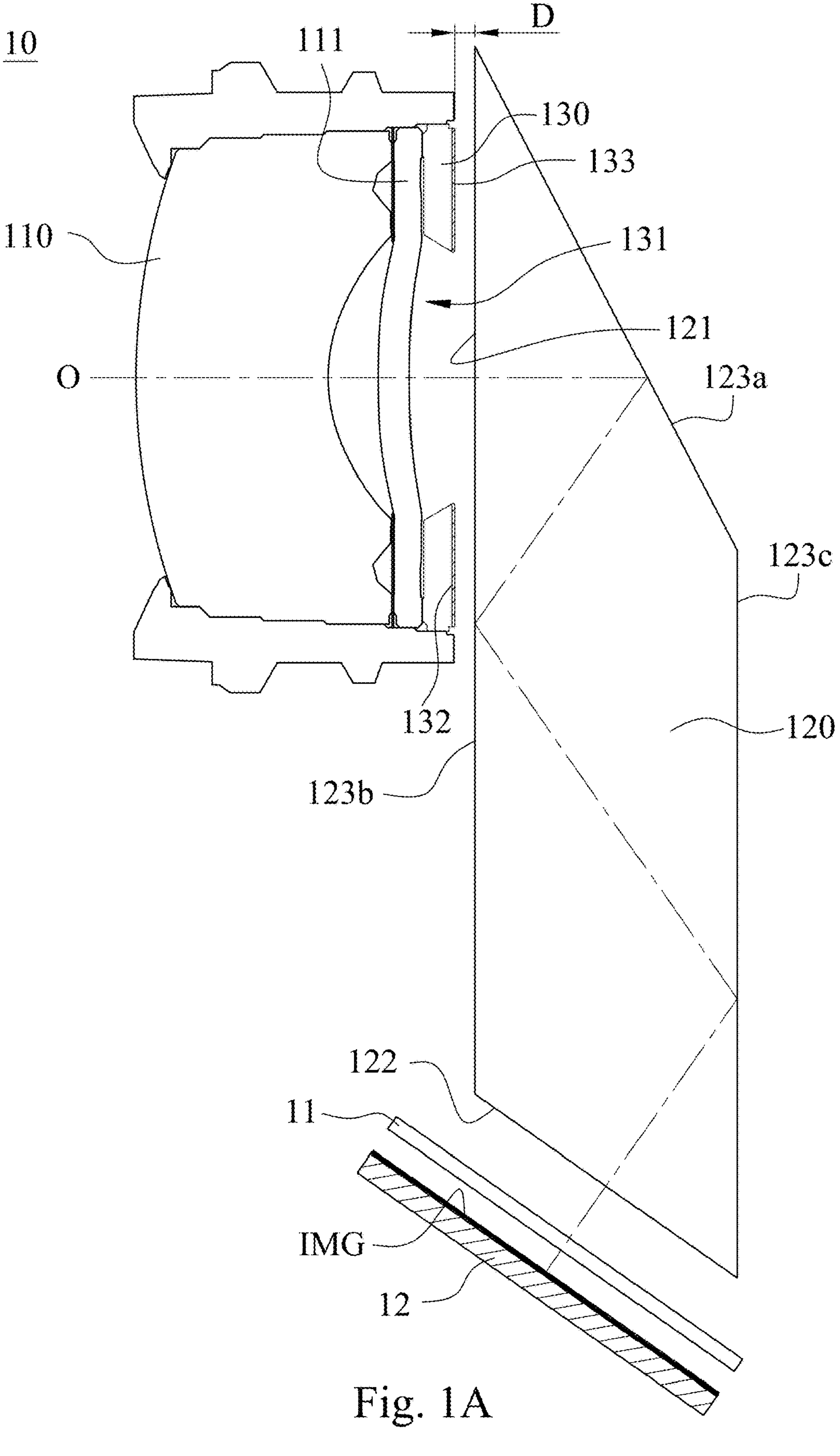
FIG. 1A is a schematic view of a camera module according to the 1st Example of the present disclosure.

The present disclosure provides an optical imaging module, including an optical imaging lens assembly, a light path folding element and a light blocking element. The optical imaging lens assembly includes at least one optical lens element. The light path folding element has an incident surface, an emitting surface and at least one optical reflecting surface, and the light path folding element is disposed on an image side of the optical imaging lens assembly. The light blocking element is disposed on one of the at least one optical lens element and the light path folding element, and the light blocking element includes a light blocking surface. The light blocking surface is opposite to at least one of the incident surface, the emitting surface and the at least one optical reflecting surface of the light path folding element, and the light blocking surface has an anti-reflective light blocking membrane layer. A surface of the anti-reflective light blocking membrane layer has a plurality of nanostructures, and the nanostructures are arranged in an irregular form. Therefore, the volume of the optical imaging module is reduced by the light path folding element, so as to be applicable to the telephoto imaging system. Furthermore, the incident surface, the emitting surface and the optical reflecting surface of the light path folding element are all the interfaces that are easy to form the stray light, so the stray light formed in the specific area is shielded by setting the light blocking element corresponding to the light path folding element. Moreover, the high-efficiency light blocking effect can be provided by the anti-reflective light blocking membrane layer with a plurality of nanostructures, and the nanostructures are arranged in the non-fixed form, so that the optical diffraction can be avoided to generate, and the actual light path of the imaging light is more in line with the default path.

Specifically, the light blocking surface of the light blocking element is disposed toward the light path folding element; or the light blocking element can include an opening hole, wherein the opening hole is corresponded to one of the incident surface and the emitting surface of the light path folding element, and the light blocking surface is adjacent to the opening hole. In detail, the light blocking element can be a lens barrel, a retaining element, a lens carrier, a reflective element carrier, or a baffle, which is not limited thereto.

The optical axis of the optical imaging module can travel through the incident surface, the emitting surface and the optical reflecting surface of the light path folding element. Therefore, the travelling direction of the optical axis of the optical imaging module can be changed by the light path folding element.

The optical reflecting surface can use the high-reflecting film to reflect the imaging light, also can use the optical total reflection phenomenon to reflect the imaging light, or the light path folding element can have the optical reflecting surface that using the optical total reflection phenomenon and the optical reflecting surface that using the high-reflecting film at the same time.

The anti-reflective light blocking membrane layer can be formed by using the atomic layer deposition (ALD) technology, or using the physical vapor deposition (PVD), such as evaporation deposition or sputter deposition, or using the chemical vapor deposition (CVD), such as ultrahigh vacuum chemical vapor deposition, microwave plasma assisted chemical vapor deposition, plasma enhanced chemical vapor deposition, etc. Furthermore, the main material of the anti-reflective light blocking membrane layer can be aluminum oxide ($Al_2O_3$), also can be carbon black material or optical thin film material.

The nanostructures can also be called the sub-wavelength structures, and the size of the structures can be between 5 nm to 500 nm, which can have the better anti-reflection effect. Furthermore, observed by the scanning electron microscope (SEM), the nanostructures can form a ridge-like protrusion structure or a ball-like protrusion structure, which is not limited thereto.

The light blocking surface can be opposite to the incident surface of the light path folding element. Therefore, the probability of non-imaging light generated between the incident surface and the light blocking element can be reduced. Alternatively, the light blocking surface can be opposite to the emitting surface of the light path folding element. Therefore, the probability of non-imaging light generated between the emitting surface and the light blocking element can be reduced. Alternatively, the light blocking surface can be opposite to the optical reflecting surface of the light path folding element. Due to the optical reflecting surface of the light path folding element is easy to be penetrated by the light, so the light transmitted from the optical reflecting surface is effectively shielded.

The optical reflecting surface of the light path folding element can reflect the imaging light by the optical total reflection phenomenon. Therefore, the optical design using the optical total reflection phenomenon can reduce the manufacturing cost. Alternatively, the optical reflecting surface of the light path folding element can reflect the imaging light by the high-reflecting film. Therefore, the mass production of the light path folding element can be provided.

The structural shape of the nanostructures can be the ball-like protrusion structure. Specifically, the nanostructures can be formed by the carbon black layer processed by the specific process. After the nanostructures formed, the coating layer is coated on the outside to protect the structure and provide the higher coating stability. Therefore, the durability and the structural stability of the anti-reflective light blocking membrane layer can be enhanced to improve the product yield and reduce the reflectivity of the light blocking surface.

When a size of the ball-like protrusion structure of the nanostructure is BS, the following condition is satisfied: 12 nm<BS<138 nm. Therefore, the plating yield of the nanostructures can be improved and the lower optical reflectance can be taken into account.

The structural shape of the nanostructures can be the ridge-like protrusion structure. Specifically, the nanostructures can be formed by depositing aluminum oxide processed by the specific process, and the structures formed like the ridge which are wide bottom and narrow top. Therefore, the equivalent refractive index of the anti-reflective light blocking membrane layer can be reduced gradually from the bottom to the top of the nanostructures, so that the reflectivity of the light blocking surface is reduced.

When a size of the ridge-like protrusion structure of the nanostructure is RS, the following condition is satisfied: 60 nm<RS<360 nm. Therefore, the nanostructures can be distributed more uniformly, so as to provide the higher coating quality.

The number of the optical reflecting surface of the light path folding element can be greater than or equal to two, which is suitable for the optical system with longer back focal length. Therefore, the space behind the optical imaging lens assembly can be used more efficiently.

The opening hole of the light blocking element is a non-circular opening hole. Specifically, the opening hole of the light blocking element can be rectangular, also can be polygonal, or can be ring-shaped composed of a plurality of straight sides and curved sides. Therefore, different forms of the light blocking element can be provided according to the shading requirements to increase the efficiency of the shading light.

The light blocking surface can be disposed between the optical lens element and the light path folding element. Therefore, due to the multiple reflections of the light are generated easily between the optical lens element and the light path folding element, so the high-intensity stray light can be effectively reduced by the light blocking element disposed here.

When a distance between the light blocking surface and the light path folding element is D, the following condition is satisfied: 0 mm<D<1.8 mm. Therefore, the higher assembly efficiency can be provided. Furthermore, the following condition is satisfied: 0 mm<D<1.2 mm. Therefore, the feasibility of miniaturization of the optical imaging module can be provided.

Each of the aforementioned features of the optical imaging module can be utilized in various combinations for achieving the corresponding effects.

The present disclosure provides a camera module, which includes the aforementioned optical imaging module and an image sensor.

The present disclosure provides an electronic device, which includes the aforementioned camera module.

According to the aforementioned embodiment, specific examples are provided, and illustrated via figures.

1st Example

FIG. 1A is a schematic view of a camera module 10 according to the 1st Example of the present disclosure. In FIG. 1A, the camera module 10 includes an optical imaging module (not shown in drawings), a filter 11 and an image sensor 12, and the image sensor 12 is disposed on an imaging surface IMG of the optical imaging module.

Figure 1B:
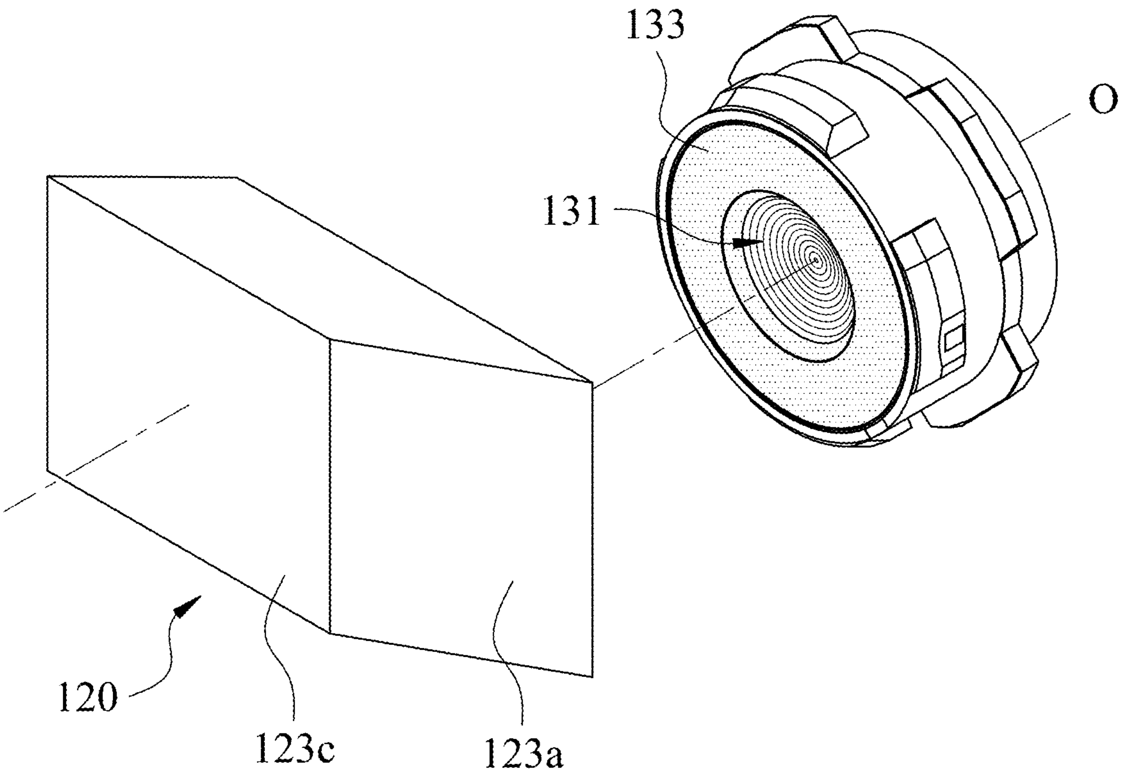
FIG. 1B is an exploded view of the optical imaging module according to the 1st Example in FIG. 1A.

FIG. 1B is an exploded view of the optical imaging module according to the 1st Example in FIG. 1A. In FIG. 1A and FIG. 1B, the optical imaging module includes an optical imaging lens assembly 110, a light path folding element 120 and a light blocking element 130. The optical imaging lens assembly 110 includes at least one optical lens element 111. The light path folding element 120 has an incident surface 121, an emitting surface 122 and three optical reflecting surfaces 123*a*, 123*b*, 123*c*, and the light path folding element 120 is disposed on an image side of the optical imaging lens assembly 110. Specifically, according to the 1st Example in FIG. 1A, the light path folding element 120 includes an optical surface, which is opposite to the optical imaging lens assembly 110, and the optical surface includes the incident surface 121 and the optical reflecting surface 123*b* at the same time. Therefore, after a light enters the light path folding element 120 from the incident surface 121, the light is internally reflected by the optical reflecting surfaces 123*a*, 123*b*, 123*c* in sequence, and the light enters the image sensor 12 from the emitting surface 122 finally. The light blocking element 130 is disposed on the optical lens element 111, and the light blocking element 130 includes an opening hole 131 and a light blocking surface 132. The opening hole 131 is corresponded to the incident surface 121 of the light path folding element 120, and the light blocking surface 132 is adjacent to the opening hole 131. Further, the light blocking surface 132 has an anti-reflective light blocking membrane layer 133, and the light blocking surface 132 is opposite to the incident surface 121 of the light path folding element 120, so that the probability of non-imaging light generated between the incident surface 121 and the light blocking element 130 can be reduced.

In detail, the optical axis O of the optical imaging module can travel through the incident surface 121, the emitting surface 122 and the optical reflecting surfaces 123*a*, 123*b*, 123*c* of the light path folding element 120, so that the travelling direction of the optical axis O of the optical imaging module can be changed by the light path folding element 120. Further, the optical reflecting surfaces 123*a*, 123*b*, 123*c* can use the high-reflecting film to reflect the imaging light to provide the mass production of the light path folding element 120; or the optical reflecting surfaces 123*a*, 123*b*, 123*c* also can use the optical total reflection phenomenon to reflect the imaging light to reduce the manufacturing cost; or the light path folding element 120 can have the optical reflecting surfaces 123*a*, 123*b*, 123*c* that using the optical total reflection phenomenon and using the high-reflecting film at the same time. Moreover, a number of the optical reflecting surfaces 123*a*, 123*b*, 123*c* is greater than two, which is suitable for the optical system with longer back focal length. Therefore, the space behind the optical imaging lens assembly 110 can be used more efficiently.

In FIG. 1A, the light blocking element 130 is a baffle, and the light blocking surface 132 is disposed between the optical lens element 111 and the light path folding element 120. Specifically, due to the multiple reflections of the light are generated easily between the optical lens element 111 and the light path folding element 120, so the high-intensity stray light can be effectively reduced by the light blocking element 130 disposed between the optical lens element 111 and the light path folding element 120. Furthermore, the incident surface 121, the emitting surface 122 and the optical reflecting surfaces 123*a*, 123*b*, 123*c* of the light path folding element 120 are all the interfaces that are easy to form the stray light. Therefore, the stray light formed in the specific area is shielded by setting the light blocking element 130 corresponding to the light path folding element 120. Further, in the 1st Example, a distance D between the light blocking surface 132 and the light path folding element 120 is 0.326 mm, so that the higher assembly efficiency and the feasibility of miniaturization of the optical imaging module can be provided.

Figure 1C:
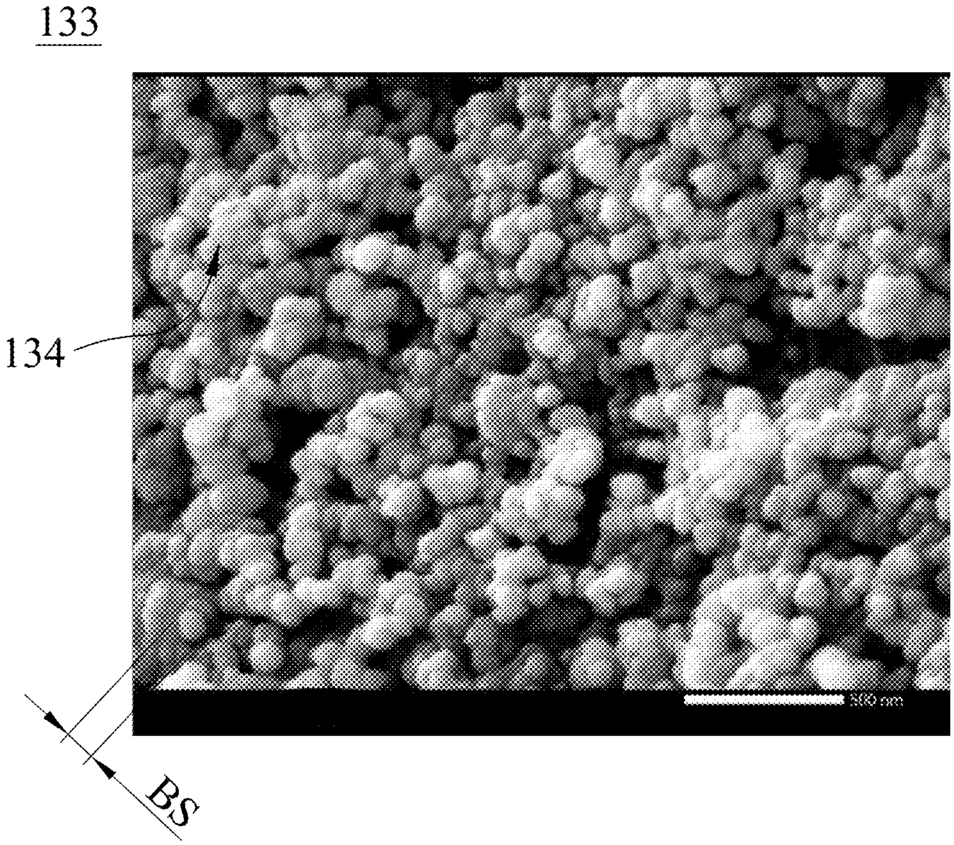
FIG. 1C is a scanning electron microscope image of the anti-reflective light blocking membrane layer according to the 1st Example in FIG. 1B.

FIG. 1C is a scanning electron microscope image of the anti-reflective light blocking membrane layer 133 according to the 1st Example in FIG. 1B. In FIG. 1C, the surface of the anti-reflective light blocking membrane layer 133 observed by looking down the scanning electron microscope image has a plurality of nanostructures 134, which can provide the high-efficiency light blocking effect. Furthermore, a structural shape of each of the nanostructures 134 is a ball-like protrusion structure, and the nanostructures 134 are arranged in an irregular form, so that the optical diffraction can be avoided to generate, and the actual light path of the imaging light is more in line with the default path. Specifically, the nanostructures 134 are formed by the carbon black layer processed by the specific process. After the nanostructures 134 formed, the coating layer is coated on the outside to protect the structure and provide the higher coating stability. Therefore, the durability and the structural stability of the anti-reflective light blocking membrane layer 133 can be enhanced to improve the product yield and reduce the reflectivity of the light blocking surface 132. Furthermore, the nanostructures 134 can also be called the sub-wavelength structures, and the size of the structures can be between 5 nm to 500 nm, which can have the better anti-reflection effect. In detail, in the 1st Example, a size BS of the ball-like protrusion structure of each of the nanostructures 134 is 99.5 nm, so that the plating yield of the nanostructures 134 can be improved and the lower optical reflectance can be taken into account.

2nd Example

Figure 2A:
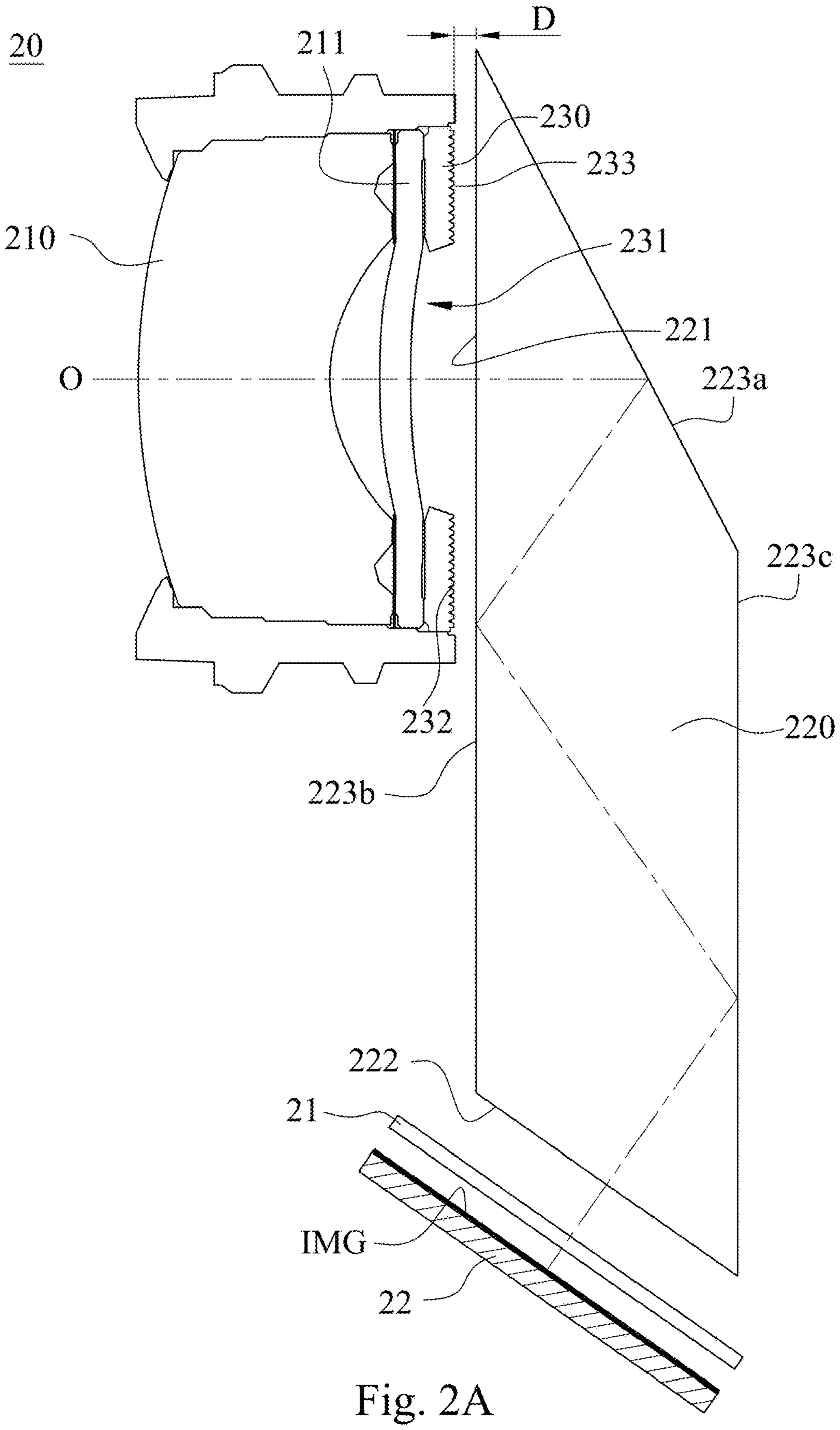
FIG. 2A is a schematic view of a camera module according to the 2nd Example of the present disclosure.

FIG. 2A is a schematic view of a camera module 20 according to the 2nd Example of the present disclosure. In FIG. 2A, the camera module 20 includes an optical imaging module (not shown in drawings), a filter 21 and an image sensor 22, and the image sensor 22 is disposed on an imaging surface IMG of the optical imaging module.

Figure 2B:
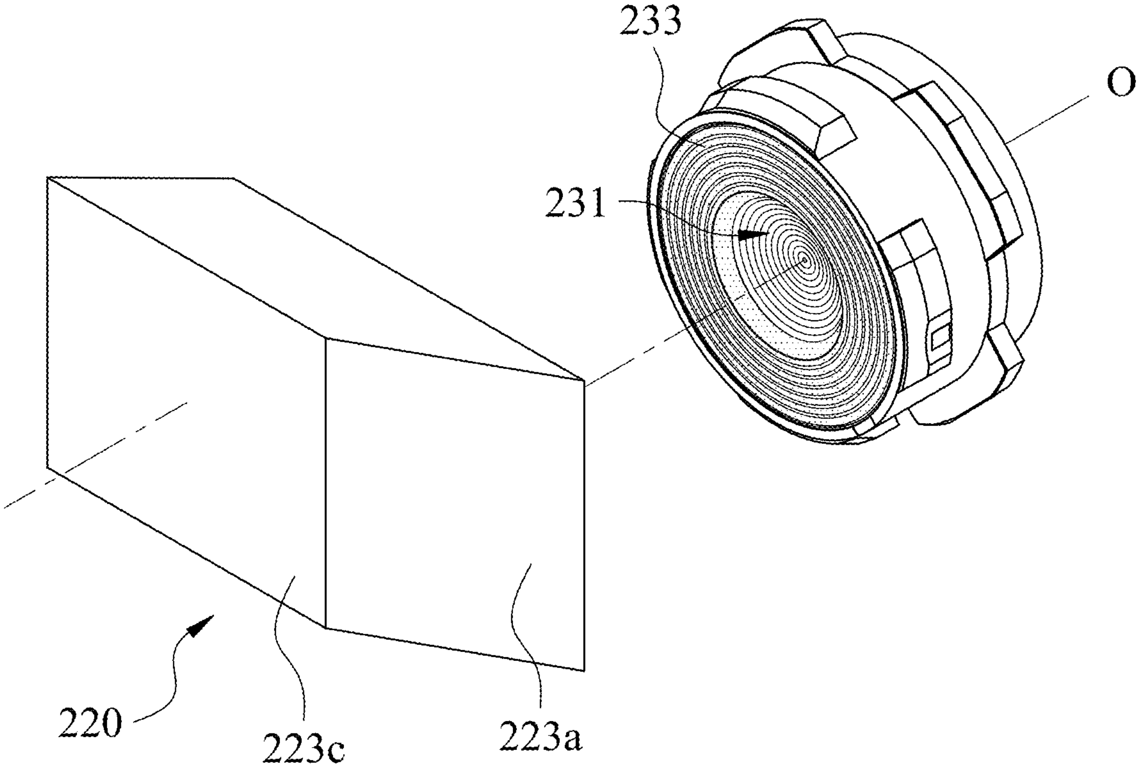
FIG. 2B is an exploded view of the optical imaging module according to the 2nd Example in FIG. 2A.

FIG. 2B is an exploded view of the optical imaging module according to the 2nd Example in FIG. 2A. In FIG. 2A and FIG. 2B, the optical imaging module includes an optical imaging lens assembly 210, a light path folding element 220 and a light blocking element 230. The optical imaging lens assembly 210 includes at least one optical lens element 211. The light path folding element 220 has an incident surface 221, an emitting surface 222 and three optical reflecting surfaces 223*a*, 223*b*, 223*c*, and the light path folding element 220 is disposed on an image side of the optical imaging lens assembly 210. Specifically, according to the 2nd Example in FIG. 2A, the light path folding element 220 includes an optical surface, which is opposite to the optical imaging lens assembly 210, and the optical surface includes the incident surface 221 and the optical reflecting surface 223*b* at the same time. Therefore, after a light enters the light path folding element 220 from the incident surface 221, the light is internally reflected by the optical reflecting surfaces 223*a*, 223*b*, 223*c* in sequence, and the light enters the image sensor 22 from the emitting surface 222 finally. The light blocking element 230 is disposed on the optical lens element 211, and the light blocking element 230 includes an opening hole 231 and a light blocking surface 232. The opening hole 231 is corresponded to the incident surface 221 of the light path folding element 220, and the light blocking surface 232 is adjacent to the opening hole 231. Further, the light blocking surface 232 has an anti-reflective light blocking membrane layer 233, and the light blocking surface 232 is opposite to the incident surface 221 of the light path folding element 220, so that the probability of non-imaging light generated between the incident surface 221 and the light blocking element 230 can be reduced.

In detail, the optical axis O of the optical imaging module can travel through the incident surface 221, the emitting surface 222 and the optical reflecting surfaces 223*a*, 223*b*, 223*c* of the light path folding element 220, so that the travelling direction of the optical axis O of the optical imaging module can be changed by the light path folding element 220. Further, the optical reflecting surfaces 223*a*, 223*b*, 223*c* can use the high-reflecting film to reflect the imaging light to provide the mass production of the light path folding element 220; or the optical reflecting surfaces 223*a*, 223*b*, 223*c* also can use the optical total reflection phenomenon to reflect the imaging light to reduce the manufacturing cost; or the light path folding element 220 can have the optical reflecting surfaces 223*a*, 223*b*, 223*c* that using the optical total reflection phenomenon and using the high-reflecting film at the same time. Moreover, a number of the optical reflecting surfaces 223*a*, 223*b*, 223*c* is greater than two, which is suitable for the optical system with longer back focal length. Therefore, the space behind the optical imaging lens assembly 210 can be used more efficiently.

In FIG. 2A, the light blocking element 230 is a baffle, and the light blocking surface 232 is disposed between the optical lens element 211 and the light path folding element 220. Specifically, due to the multiple reflections of the light are generated easily between the optical lens element 211 and the light path folding element 220, so the high-intensity stray light can be effectively reduced by the light blocking element 230 disposed between the optical lens element 211 and the light path folding element 220. Furthermore, the incident surface 221, the emitting surface 222 and the optical reflecting surfaces 223*a*, 223*b*, 223*c* of the light path folding element 220 are all the interfaces that are easy to form the stray light. Therefore, the stray light formed in the specific area is shielded by setting the light blocking element 230 corresponding to the light path folding element 220. Further, in the 2nd Example, a distance D between the light blocking surface 232 and the light path folding element 220 is 0.326 mm, so that the higher assembly efficiency and the feasibility of miniaturization of the optical imaging module can be provided.

Figure 2C:
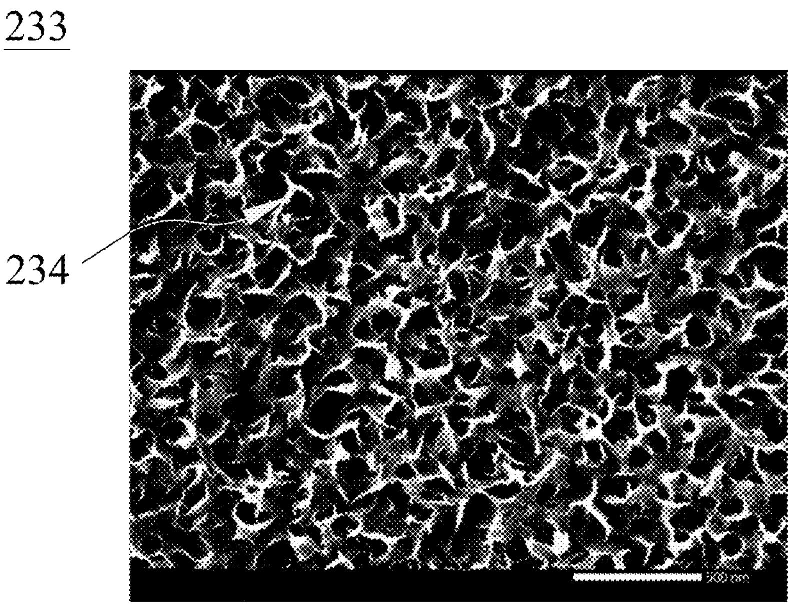
FIG. 2C is a scanning electron microscope image of the anti-reflective light blocking membrane layer according to the 2nd Example in FIG. 2B.
Figure 2D:
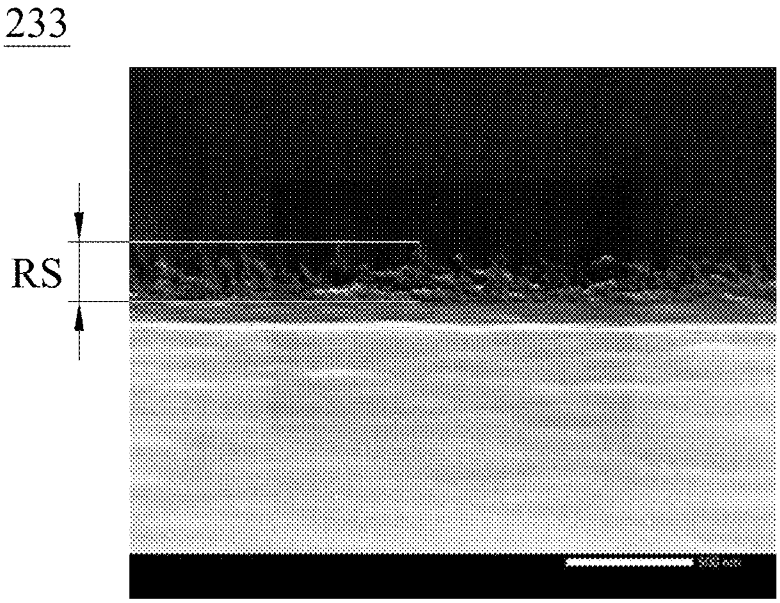
FIG. 2D is a scanning electron microscope image of a cross section of the anti-reflective light blocking membrane layer according to the 2nd Example in FIG. 2B.

FIG. 2C is a scanning electron microscope image of the anti-reflective light blocking membrane layer 233 according to the 2nd Example in FIG. 2B. FIG. 2D is a scanning electron microscope image of a cross section of the anti-reflective light blocking membrane layer 233 according to the 2nd Example in FIG. 2B. In FIG. 2C and FIG. 2D, the surface of the anti-reflective light blocking membrane layer 233 observed by looking down the scanning electron microscope image has a plurality of nanostructures 234, which can provide the high-efficiency light blocking effect. Furthermore, a structural shape of each of the nanostructures 234 is a ridge-like protrusion structure, and the nanostructures 234 are arranged in an irregular form, so that the optical diffraction can be avoided to generate, and the actual light path of the imaging light is more in line with the default path. Specifically, the nanostructures 234 are formed by depositing aluminum oxide processed by the specific process, and when observed from the cross section, the structures formed like the ridge which are wide bottom and narrow top. Therefore, the equivalent refractive index of the anti-reflective light blocking membrane layer 233 can be reduced gradually from the bottom to the top of the nanostructures 234, so that the reflectivity of the light blocking surface 232 is reduced. Furthermore, the nanostructures 234 can also be called the sub-wavelength structures, and the size of the structures can be between 5 nm to 500 nm, which can have the better anti-reflection effect. In detail, in the 2nd Example, a size RS of the ridge-like protrusion structure of each of the nanostructures 234 is 235.3 nm, so that the nanostructures 234 can be distributed more uniformly to provide the higher coating quality.

3rd Example

Figure 3A:
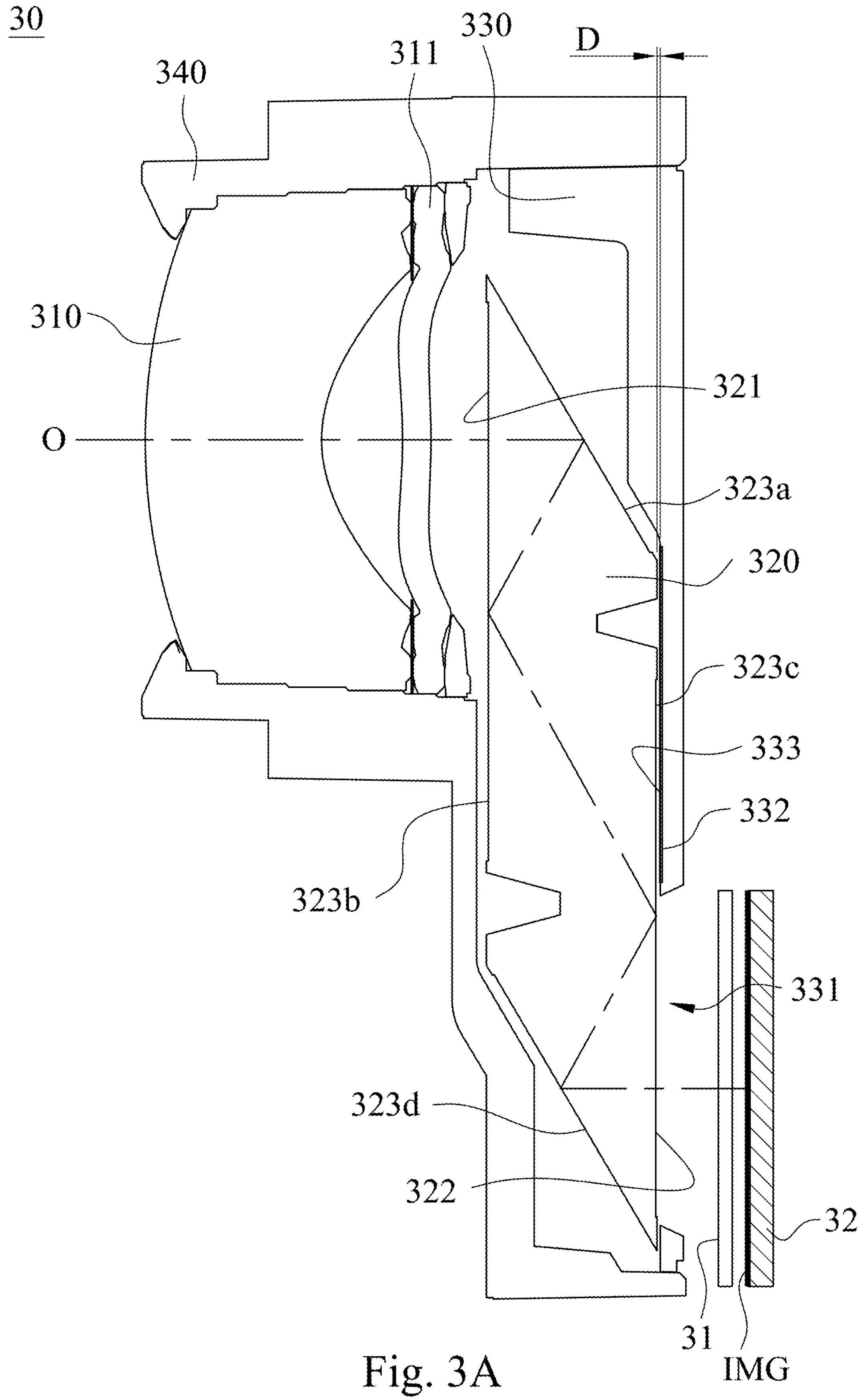
FIG. 3A is a schematic view of a camera module according to the 3rd Example of the present disclosure.

FIG. 3A is a schematic view of a camera module 30 according to the 3rd Example of the present disclosure. In FIG. 3A, the camera module 30 includes an optical imaging module (not shown in drawings), a filter 31 and an image sensor 32, and the image sensor 32 is disposed on an imaging surface IMG of the optical imaging module.

Figure 3B:
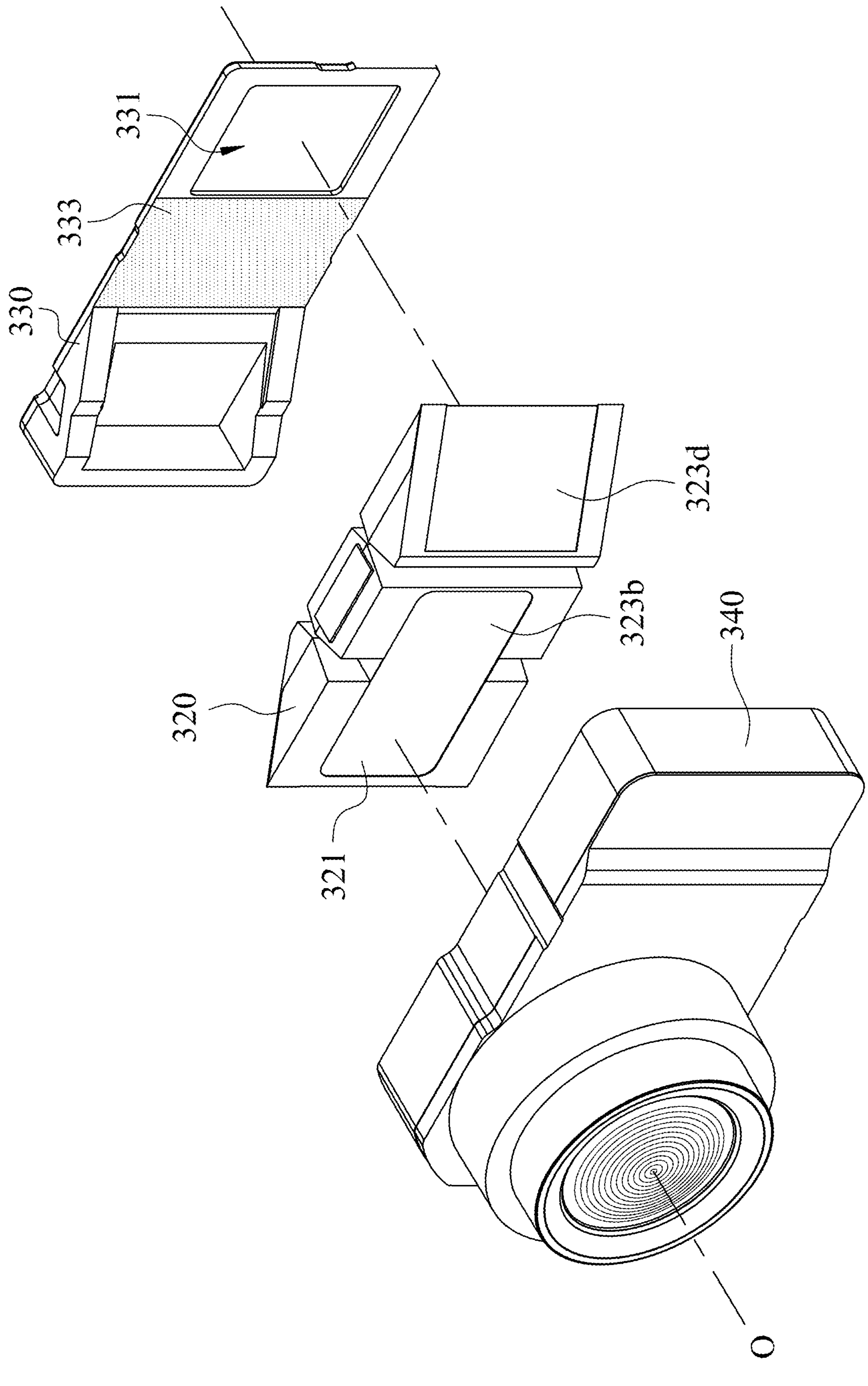
FIG. 3B is an exploded view of the optical imaging module according to the 3rd Example in FIG. 3A.

FIG. 3B is an exploded view of the optical imaging module according to the 3rd Example in FIG. 3A. In FIG. 3A and FIG. 3B, the optical imaging module includes an optical imaging lens assembly 310, a light path folding element 320 and a light blocking element 330. The optical imaging lens assembly 310 includes at least one optical lens element 311. The light path folding element 320 has an incident surface 321, an emitting surface 322 and four optical reflecting surfaces 323*a*, 323*b*, 323*c*, 323*d*, and the light path folding element 320 is disposed on an image side of the optical imaging lens assembly 310. Specifically, according to the 3rd Example in FIG. 3A, the light path folding element 320 includes two optical surfaces, one of the optical surface is opposite to the optical imaging lens assembly 310, and includes the incident surface 321 and the optical reflecting surface 323*b* at the same time, while the other optical surface is opposite to the image sensor 32, and includes the emitting surface 322 and the optical reflecting surface 323*c* at the same time. Therefore, after a light enters the light path folding element 320 from the incident surface 321, the light is internally reflected by the optical reflecting surfaces 323*a*, 323*b*, 323*c*, 323*d* in sequence, and the light enters the image sensor 32 from the emitting surface 322 finally. The light blocking element 330 is disposed on the light path folding element 320, and the light blocking element 330 includes an opening hole 331 and a light blocking surface 332. The opening hole 331 is corresponded to the emitting surface 322 of the light path folding element 320, and the light blocking surface 332 is adjacent to the opening hole 331. Further, the light blocking surface 332 has an anti-reflective light blocking membrane layer 333, and the light blocking surface 332 is opposite to the optical reflecting surface 323*c* of the light path folding element 320. Due to the optical reflecting surface 323*c* of the light path folding element 320 is easy to be penetrated by the light, so the light transmitted from the optical reflecting surface 323*c* is effectively shielded.

Furthermore, the optical imaging module can further include a carrier 340, which is used to accommodate or assemble the light path folding element 320, and the light blocking element 330 can be used to assemble the light path folding element 320 into the carrier 340. The assembly surface of the light blocking element 330 can be used to fix the light path folding element 320 by the supporting manner, or can be used to fix the light path folding element 320 by providing the glue.

In detail, the optical axis O of the optical imaging module can travel through the incident surface 321, the emitting surface 322 and the optical reflecting surfaces 323*a*, 323*b*, 323*c*, 323*d* of the light path folding element 320, so that the travelling direction of the optical axis O of the optical imaging module can be changed by the light path folding element 320. Further, the optical reflecting surfaces 323*a*, 323*b*, 323*c*, 323*d* can use the high-reflecting film to reflect the imaging light to provide the mass production of the light path folding element 320; or the optical reflecting surfaces 323*a*, 323*b*, 323*c*, 323*d* also can use the optical total reflection phenomenon to reflect the imaging light to reduce the manufacturing cost; or the light path folding element 320 can have the optical reflecting surfaces 323*a*, 323*b*, 323*c*, 323*d* that using the optical total reflection phenomenon and using the high-reflecting film at the same time. Moreover, a number of the optical reflecting surfaces 323*a*, 323*b*, 323*c*, 323*d* is greater than two, which is suitable for the optical system with longer back focal length. Therefore, the space behind the optical imaging lens assembly 310 can be used more efficiently.

In FIG. 3A and FIG. 3B, the light blocking element 330 is a retaining element, and the opening hole 331 of the light blocking element 330 is rectangular to response the different shading requirements to increase the efficiency of the shading light. Furthermore, the incident surface 321, the emitting surface 322 and the optical reflecting surfaces 323*a*, 323*b*, 323*c*, 323*d* of the light path folding element 320 are all the interfaces that are easy to form the stray light. Therefore, the stray light formed in the specific area is shielded by setting the light blocking element 330 corresponding to the light path folding element 320. Further, in the 3rd Example, a distance D between the light blocking surface 332 and the light path folding element 320 is 0.05 mm, so that the higher assembly efficiency and the feasibility of miniaturization of the optical imaging module can be provided.

Figure 3C:
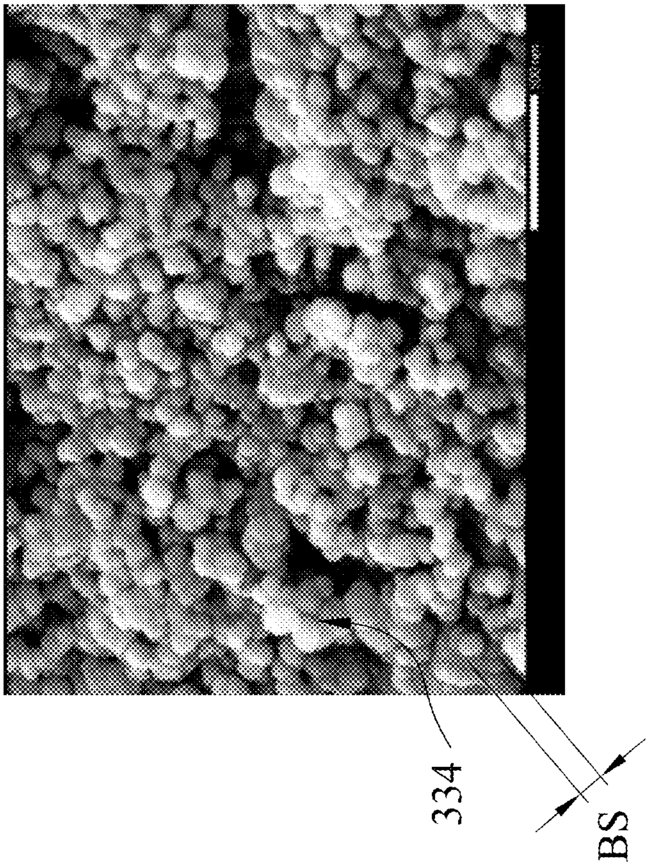
FIG. 3C is a scanning electron microscope image of the anti-reflective light blocking membrane layer according to the 3rd Example in FIG. 3B.

FIG. 3C is a scanning electron microscope image of the anti-reflective light blocking membrane layer 333 according to the 3rd Example in FIG. 3B. In FIG. 3C, the surface of the anti-reflective light blocking membrane layer 333 observed by looking down the scanning electron microscope image has a plurality of nanostructures 334, which can provide the high-efficiency light blocking effect. Furthermore, a structural shape of each of the nanostructures 334 is a ball-like protrusion structure, and the nanostructures 334 are arranged in an irregular form, so that the optical diffraction can be avoided to generate, and the actual light path of the imaging light is more in line with the default path. Specifically, the nanostructures 334 are formed by the carbon black layer processed by the specific process. After the nanostructures 334 formed, the coating layer is coated on the outside to protect the structure and provide the higher coating stability. Therefore, the durability and the structural stability of the anti-reflective light blocking membrane layer 333 can be enhanced to improve the product yield and reduce the reflectivity of the light blocking surface 332. Furthermore, the nanostructures 334 can also be called the sub-wavelength structures, and the size of the structures can be between 5 nm to 500 nm, which can have the better anti-reflection effect. In detail, in the 3rd Example, a size BS of the ball-like protrusion structure of each of the nanostructures 334 is 66.1 nm, so that the plating yield of the nanostructures 334 can be improved and the lower optical reflectance can be taken into account.

4th Example

Figure 4A:
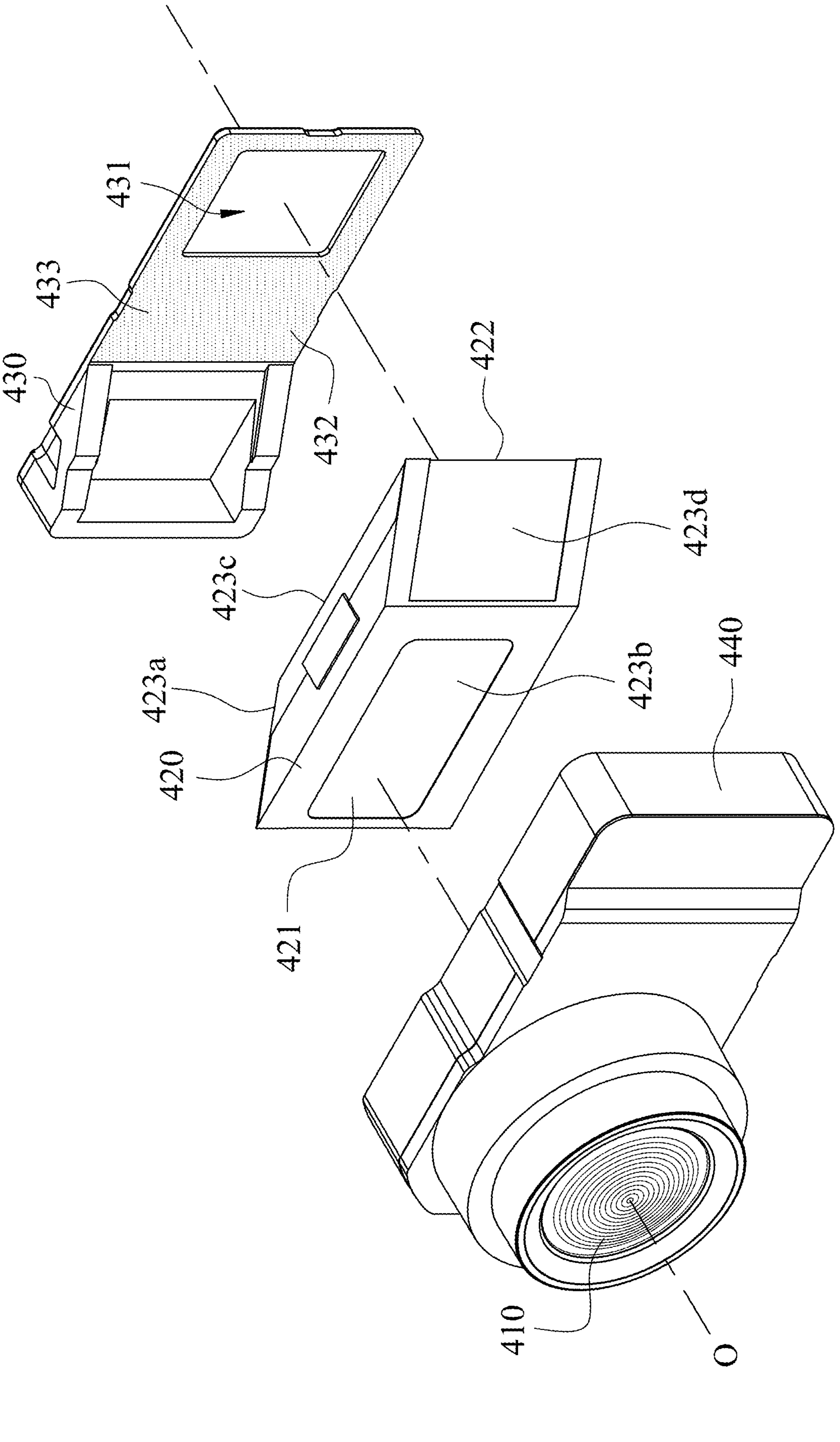
FIG. 4A is an exploded view of the optical imaging module according to the 4th Example of the present disclosure.

FIG. 4A is an exploded view of the optical imaging module according to the 4th Example of the present disclosure. In FIG. 4A, the optical imaging module includes an optical imaging lens assembly 410, a light path folding element 420 and a light blocking element 430. The optical imaging lens assembly 410 includes at least one optical lens element (not shown in drawings). The light path folding element 420 has an incident surface 421, an emitting surface 422 and four optical reflecting surfaces 423*a*, 423*b*, 423*c*, 423*d*, and the light path folding element 420 is disposed on an image side of the optical imaging lens assembly 410. Specifically, according to the 4th Example in FIG. 4A, the light path folding element 420 includes two optical surfaces, one of the optical surface is opposite to the optical imaging lens assembly 410, and includes the incident surface 421 and the optical reflecting surface 423*b* at the same time, while the other optical surface is opposite to the image sensor (not shown in drawings), and includes the emitting surface 422 and the optical reflecting surface 423*c* at the same time. Therefore, after a light enters the light path folding element 420 from the incident surface 421, the light is internally reflected by the optical reflecting surfaces 423*a*, 423*b*, 423*c*, 423*d* in sequence, and the light enters the image sensor from the emitting surface 422 finally. The light blocking element 430 is disposed on the light path folding element 420, and the light blocking element 430 includes an opening hole 431 and a light blocking surface 432. The opening hole 431 is corresponded to the emitting surface 422 of the light path folding element 420, and the light blocking surface 432 is adjacent to the opening hole 431. Further, the light blocking surface 432 has an anti-reflective light blocking membrane layer 433, and the light blocking surface 432 is opposite to the optical reflecting surface 423*c* and the emitting surface 422 of the light path folding element 420. Due to the optical reflecting surface 423*c* of the light path folding element 420 is easy to be penetrated by the light, so the light transmitted from the optical reflecting surface 423*c* is effectively shielded, and the probability of non-imaging light generated between the emitting surface 422 and the light blocking element 430 can be reduced. It must be noted that the optical imaging module of the 4th Example can be mounted in a camera module as the optical imaging module of the 1st Example to the 3rd Example, and has the same or similar configuration relationship with other elements such as the filter and the image sensor of the camera module, and will not be described herein.

Furthermore, the optical imaging module can further include a carrier 440, which is used to accommodate or assemble the light path folding element 420, and the light blocking element 430 can be used to assemble the light path folding element 420 into the carrier 440. The assembly surface of the light blocking element 430 can be used to fix the light path folding element 420 by the supporting manner, or can be used to fix the light path folding element 420 by providing the glue.

In detail, the optical axis O of the optical imaging module can travel through the incident surface 421, the emitting surface 422 and the optical reflecting surfaces 423*a*, 423*b*, 423*c*, 423*d* of the light path folding element 420, so that the travelling direction of the optical axis O of the optical imaging module can be changed by the light path folding element 420. Further, the optical reflecting surfaces 423*a*, 423*b*, 423*c*, 423*d* can use the high-reflecting film to reflect the imaging light to provide the mass production of the light path folding element 420; or the optical reflecting surfaces 423*a*, 423*b*, 423*c*, 423*d* also can use the optical total reflection phenomenon to reflect the imaging light to reduce the manufacturing cost; or the light path folding element 420 can have the optical reflecting surfaces 423*a*, 423*b*, 423*c*, 423*d* that using the optical total reflection phenomenon and using the high-reflecting film at the same time. Moreover, a number of the optical reflecting surfaces 423*a*, 423*b*, 423*c*, 423*d* is greater than two, which is suitable for the optical system with longer back focal length. Therefore, the space behind the optical imaging lens assembly 410 can be used more efficiently.

In FIG. 4A, the light blocking element 430 is a retaining element, and the opening hole 431 of the light blocking element 430 is rectangular to response the different shading requirements to increase the efficiency of the shading light. Furthermore, the incident surface 421, the emitting surface 422 and the optical reflecting surfaces 423*a*, 423*b*, 423*c*, 423*d* of the light path folding element 420 are all the interfaces that are easy to form the stray light. Therefore, the stray light formed in the specific area is shielded by setting the light blocking element 430 corresponding to the light path folding element 420. Further, in the 4th Example, a distance D (not shown in drawings) between the light blocking surface 432 and the light path folding element 420 is 0.05 mm, so that the higher assembly efficiency and the feasibility of miniaturization of the optical imaging module can be provided.

Figure 4B:
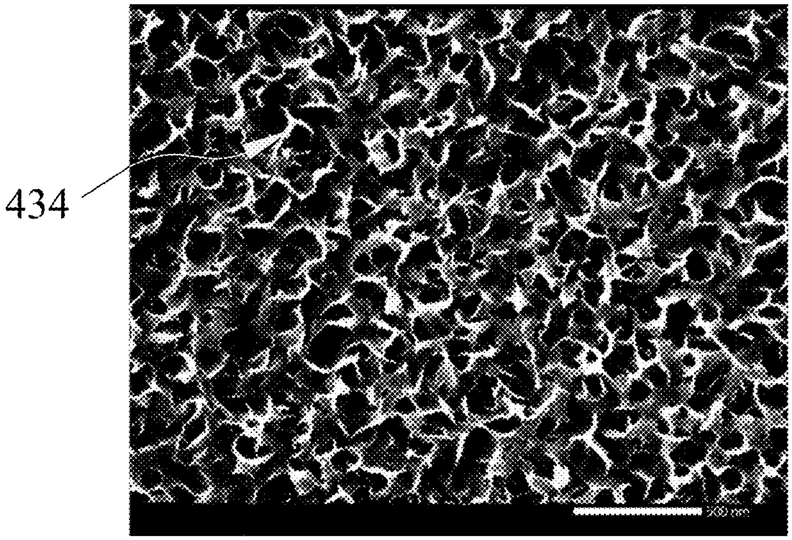
FIG. 4B is a scanning electron microscope image of the anti-reflective light blocking membrane layer according to the 4th Example in FIG. 4A.
Figure 4C:
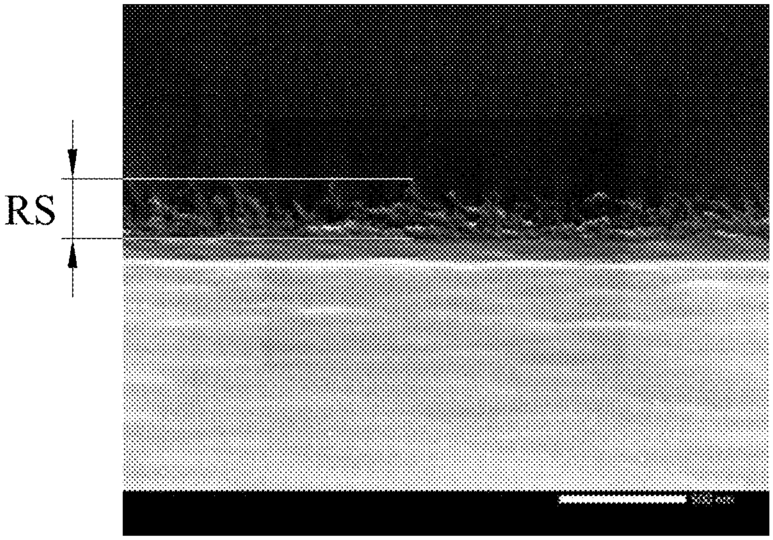
FIG. 4C is a scanning electron microscope image of a cross section of the anti-reflective light blocking membrane layer according to the 4th Example in FIG. 4A.

FIG. 4B is a scanning electron microscope image of the anti-reflective light blocking membrane layer 433 according to the 4th Example in FIG. 4A. FIG. 4C is a scanning electron microscope image of a cross section of the anti-reflective light blocking membrane layer 433 according to the 4th Example in FIG. 4A. In FIG. 4B and FIG. 4C, the surface of the anti-reflective light blocking membrane layer 433 observed by looking down the scanning electron microscope image has a plurality of nanostructures 434, which can provide the high-efficiency light blocking effect. Furthermore, a structural shape of each of the nanostructures 434 is a ridge-like protrusion structure, and the nanostructures 434 are arranged in an irregular form, so that the optical diffraction can be avoided to generate, and the actual light path of the imaging light is more in line with the default path. Specifically, the nanostructures 434 are formed by depositing aluminum oxide processed by the specific process, and when observed from the cross section, the structures formed like the ridge which are wide bottom and narrow top. Therefore, the equivalent refractive index of the anti-reflective light blocking membrane layer 433 can be reduced gradually from the bottom to the top of the nanostructures 434, so that the reflectivity of the light blocking surface 432 is reduced. Furthermore, the nanostructures 434 can also be called the sub-wavelength structures, and the size of the structures can be between 5 nm to 500 nm, which can have the better anti-reflection effect. In detail, in the 4th Example, a size RS of the ridge-like protrusion structure of each of the nanostructures 434 is 173.5 nm, so that the nanostructures 434 can be distributed more uniformly to provide the higher coating quality.

5th Example

Figure 5A:
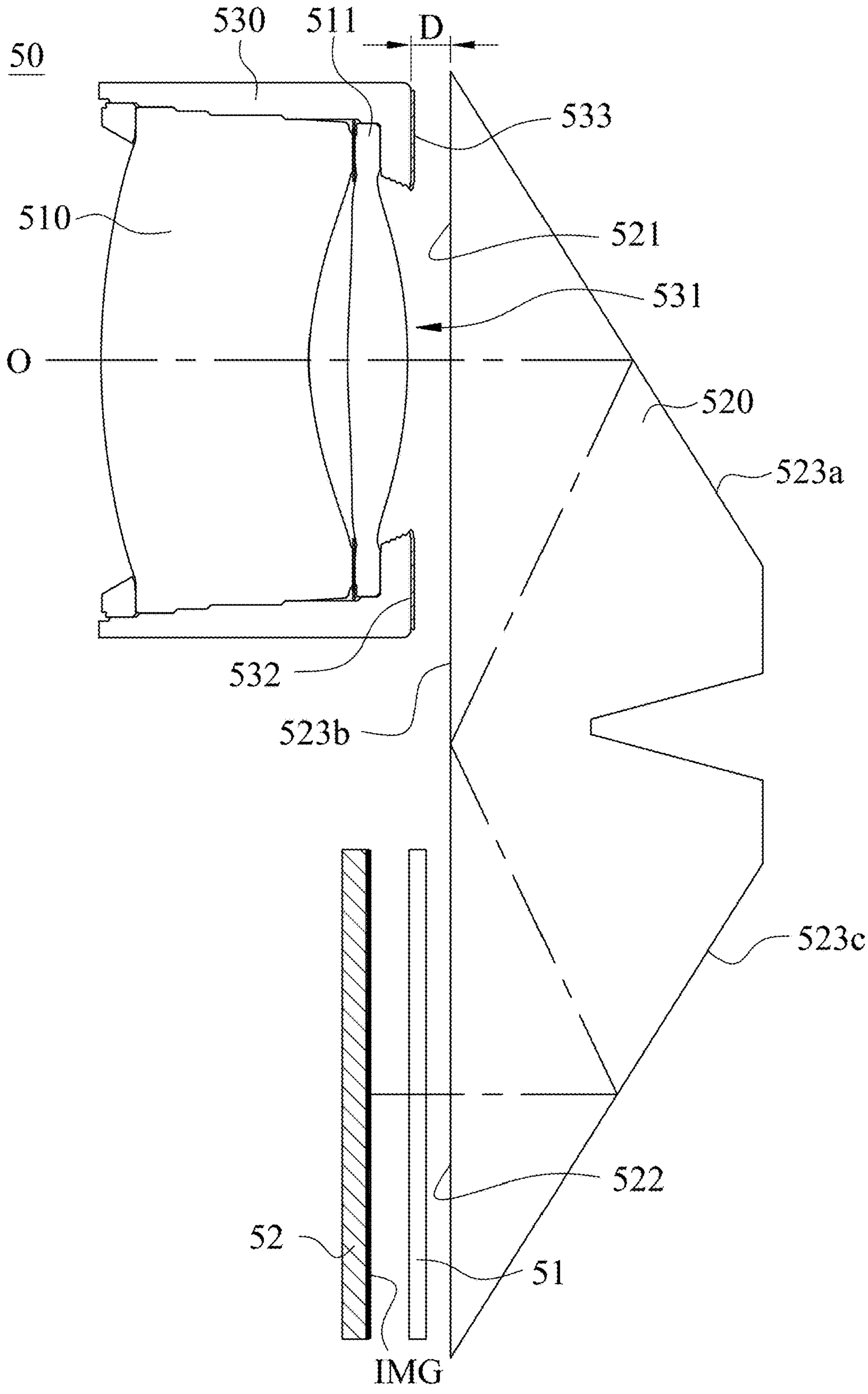
FIG. 5A is a schematic view of a camera module according to the 5th Example of the present disclosure.

FIG. 5A is a schematic view of a camera module 50 according to the 5th Example of the present disclosure. In FIG. 5A, the camera module 50 includes an optical imaging module (not shown in drawings), a filter 51 and an image sensor 52, and the image sensor 52 is disposed on an imaging surface IMG of the optical imaging module.

Figure 5B:
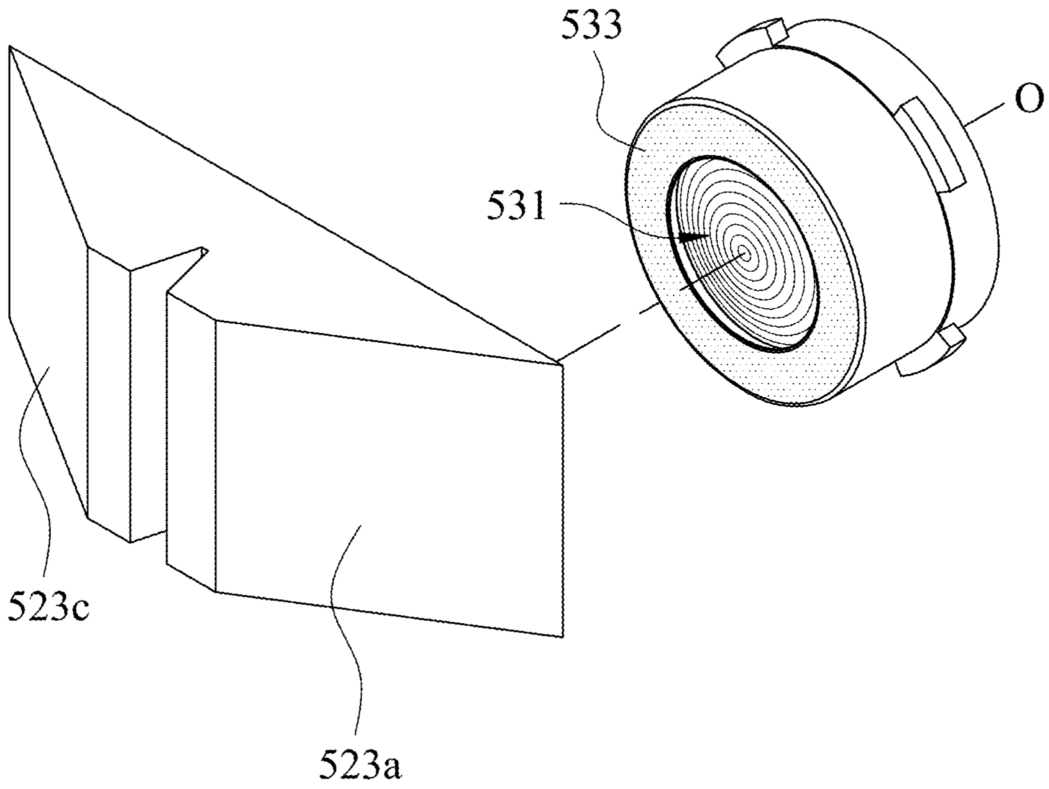
FIG. 5B is an exploded view of the optical imaging module according to the 5th Example in FIG. 5A.

FIG. 5B is an exploded view of the optical imaging module according to the 5th Example in FIG. 5A. In FIG. 5A and FIG. 5B, the optical imaging module includes an optical imaging lens assembly 510, a light path folding element 520 and a light blocking element 530. The optical imaging lens assembly 510 includes at least one optical lens element 511. The light path folding element 520 has an incident surface 521, an emitting surface 522 and three optical reflecting surfaces 523*a*, 523*b*, 523*c*, and the light path folding element 520 is disposed on an image side of the optical imaging lens assembly 510. Specifically, according to the 5th Example in FIG. 5A, the light path folding element 520 includes an optical surface, which is opposite to the optical imaging lens assembly 510 and the image sensor 52, and the optical surface includes the incident surface 521, the emitting surface 522 and the optical reflecting surface 523*b* at the same time, wherein the incident surface 521 is corresponded to the optical imaging lens assembly 510, and the emitting surface 522 is corresponded to the image sensor 52. Therefore, after a light enters the light path folding element 520 from the incident surface 521, the light is internally reflected by the optical reflecting surfaces 523*a*, 523*b*, 523*c* in sequence, and the light enters the image sensor 52 from the emitting surface 522 finally. The light blocking element 530 is disposed on the optical lens element 511, and the light blocking element 530 includes an opening hole 531 and a light blocking surface 532. The opening hole 531 is corresponded to the incident surface 521 of the light path folding element 520, and the light blocking surface 532 is adjacent to the opening hole 531. Further, the light blocking surface 532 has an anti-reflective light blocking membrane layer 533, and the light blocking surface 532 is opposite to the incident surface 521 of the light path folding element 520, so that the probability of non-imaging light generated between the incident surface 521 and the light blocking element 530 can be reduced.

In detail, the optical axis O of the optical imaging module can travel through the incident surface 521, the emitting surface 522 and the optical reflecting surfaces 523*a*, 523*b*, 523*c* of the light path folding element 520, so that the travelling direction of the optical axis O of the optical imaging module can be changed by the light path folding element 520. Further, the optical reflecting surfaces 523*a*, 523*b*, 523*c* can use the high-reflecting film to reflect the imaging light to provide the mass production of the light path folding element 520; or the optical reflecting surfaces 523*a*, 523*b*, 523*c* also can use the optical total reflection phenomenon to reflect the imaging light to reduce the manufacturing cost; or the light path folding element 520 can have the optical reflecting surfaces 523*a*, 523*b*, 523*c* that using the optical total reflection phenomenon and using the high-reflecting film at the same time. Moreover, a number of the optical reflecting surfaces 523*a*, 523*b*, 523*c* is greater than two, which is suitable for the optical system with longer back focal length. Therefore, the space behind the optical imaging lens assembly 510 can be used more efficiently.

In FIG. 5A, the light blocking element 530 is a lens barrel, and the incident surface 521, the emitting surface 522 and the optical reflecting surfaces 523*a*, 523*b*, 523*c* of the light path folding element 520 are all the interfaces that are easy to form the stray light. Therefore, the stray light formed in the specific area is shielded by setting the light blocking element 530 corresponding to the light path folding element 520. Further, in the 5th Example, a distance D between the light blocking surface 532 and the light path folding element 520 is 0.486 mm, so that the higher assembly efficiency and the feasibility of miniaturization of the optical imaging module can be provided.

Figure 5C:
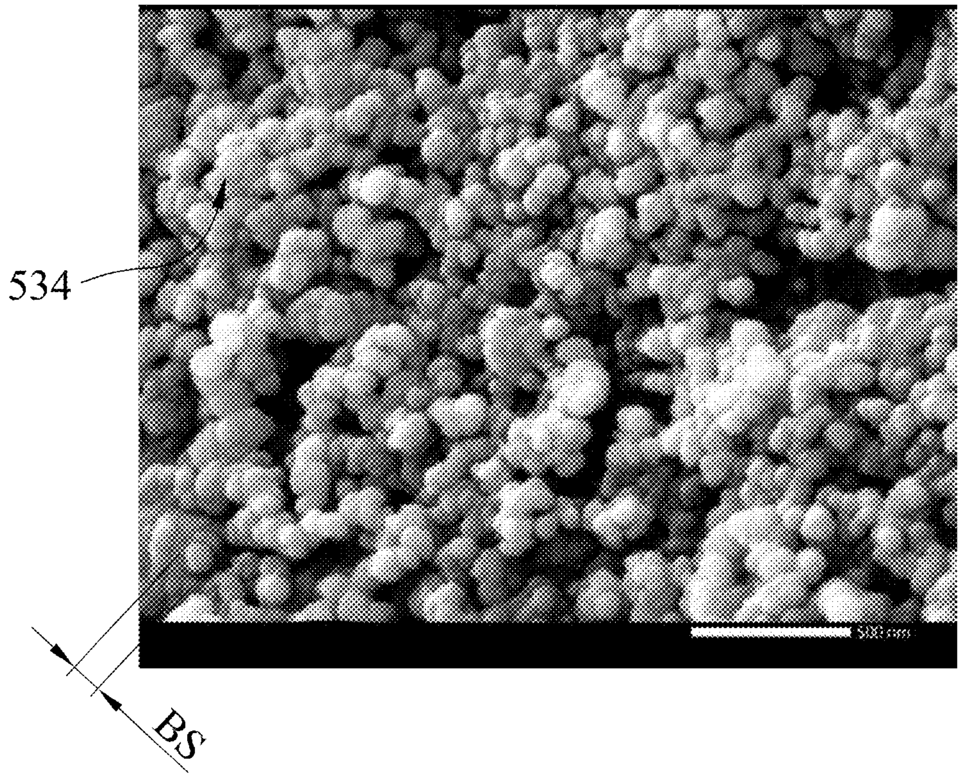
FIG. 5C is a scanning electron microscope image of the anti-reflective light blocking membrane layer according to the 5th Example in FIG. 5B.

FIG. 5C is a scanning electron microscope image of the anti-reflective light blocking membrane layer 533 according to the 5th Example in FIG. 5B. In FIG. 5C, the surface of the anti-reflective light blocking membrane layer 533 observed by looking down the scanning electron microscope image has a plurality of nanostructures 534, which can provide the high-efficiency light blocking effect. Furthermore, a structural shape of each of the nanostructures 534 is a ball-like protrusion structure, and the nanostructures 534 are arranged in an irregular form, so that the optical diffraction can be avoided to generate, and the actual light path of the imaging light is more in line with the default path. Specifically, the nanostructures 534 are formed by the carbon black layer processed by the specific process. After the nanostructures 534 formed, the coating layer is coated on the outside to protect the structure and provide the higher coating stability. Therefore, the durability and the structural stability of the anti-reflective light blocking membrane layer 533 can be enhanced to improve the product yield and reduce the reflectivity of the light blocking surface 532. Furthermore, the nanostructures 534 can also be called the sub-wavelength structures, and the size of the structures can be between 5 nm to 500 nm, which can have the better anti-reflection effect. In detail, in the 5th Example, a size BS of the ball-like protrusion structure of each of the nanostructures 534 is 110.7 nm, so that the plating yield of the nanostructures 534 can be improved and the lower optical reflectance can be taken into account.

6th Example

Figure 6A:
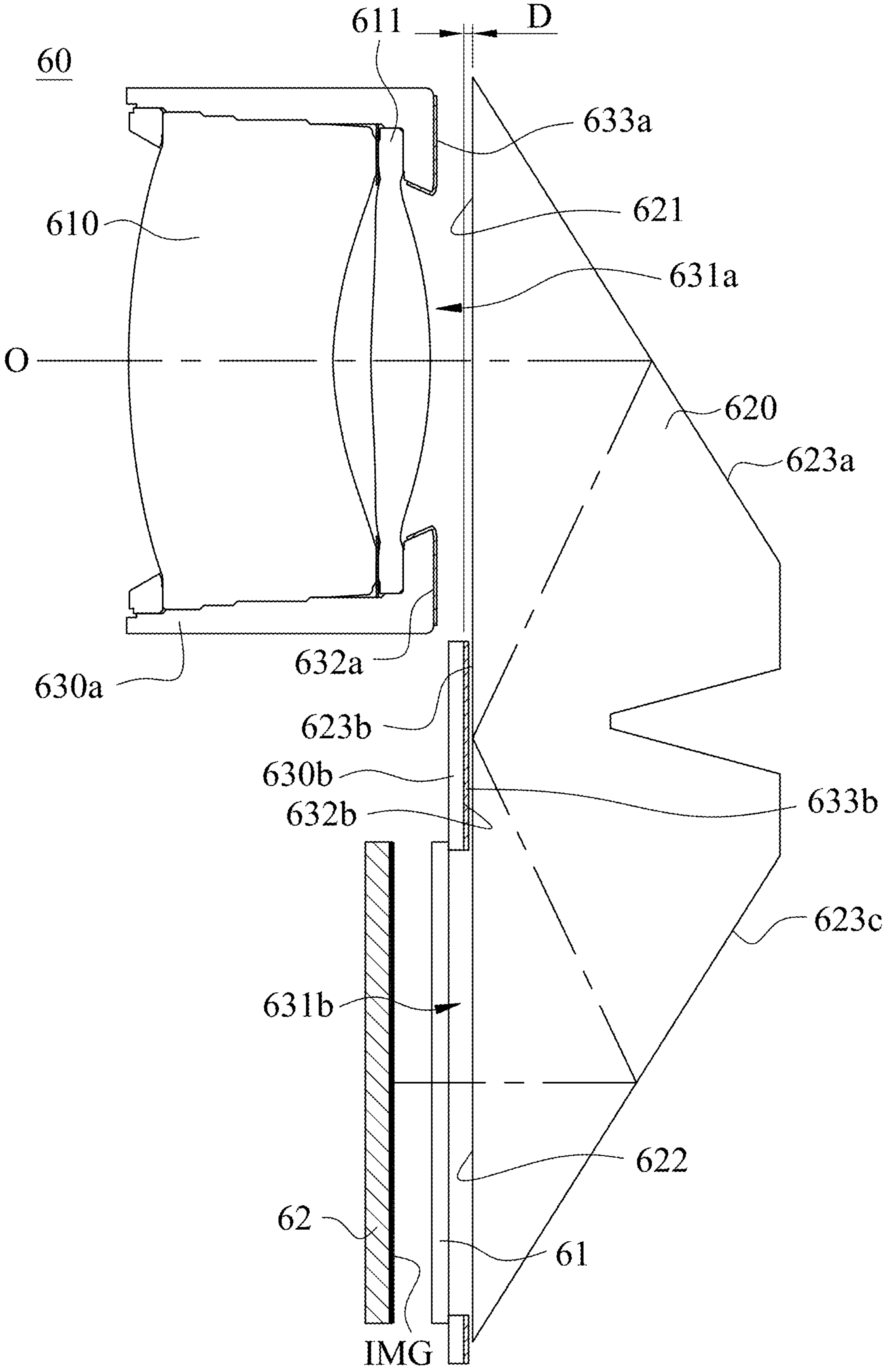
FIG. 6A is a schematic view of a camera module according to the 6th Example of the present disclosure.

FIG. 6A is a schematic view of a camera module 60 according to the 6th Example of the present disclosure. In FIG. 6A, the camera module 60 includes an optical imaging module (not shown in drawings), a filter 61 and an image sensor 62, and the image sensor 62 is disposed on an imaging surface IMG of the optical imaging module.

Specifically, the optical imaging module includes an optical imaging lens assembly 610, a light path folding element 620 and two light blocking elements 630*a*, 630*b*. The optical imaging lens assembly 610 includes at least one optical lens element 611. The light path folding element 620 has an incident surface 621, an emitting surface 622 and three optical reflecting surfaces 623*a*, 623*b*, 623*c*, and the light path folding element 620 is disposed on an image side of the optical imaging lens assembly 610. Specifically, according to the 6th Example in FIG. 6A, the light path folding element 620 includes an optical surface, which is opposite to the optical imaging lens assembly 610 and the image sensor 62, and the optical surface includes the incident surface 621, the emitting surface 622 and the optical reflecting surface 623*b* at the same time, wherein the incident surface 621 is corresponded to the optical imaging lens assembly 610, and the emitting surface 622 is corresponded to the image sensor 62. Therefore, after a light enters the light path folding element 620 from the incident surface 621, the light is internally reflected by the optical reflecting surfaces 623*a*, 623*b*, 623*c* in sequence, and the light enters the image sensor 62 from the emitting surface 622 finally. Two light blocking elements 630*a*, 630*b* are disposed on the optical lens element 611 and the light path folding element 620, respectively, wherein the light blocking element 630*a* includes an opening hole 631*a* and a light blocking surface 632*a*. The opening hole 631*a* is corresponded to the incident surface 621 of the light path folding element 620, and the light blocking surface 632*a* is adjacent to the opening hole 631*a*. Furthermore, the light blocking element 630*b* includes an opening hole 631*b* and a light blocking surface 632*b*, the opening hole 631*b* is corresponded to the emitting surface 622 of the light path folding element 620, and the light blocking surface 632*b* is adjacent to the opening hole 631*b*. Further, the light blocking surfaces 632*a*, 632*b* have the anti-reflective light blocking membrane layers 633*a*, 633*b*, respectively, and the light blocking surface 632*a* is opposite to the incident surface 621 of the light path folding element 620, so that the probability of non-imaging light generated between the incident surface 621 and the light blocking element 630*a* can be reduced. Moreover, the light blocking surface 632*b* is opposite to the optical reflecting surface 623*b* and the emitting surface 622 of the light path folding element 620. Due to the optical reflecting surface 623*b* of the light path folding element 620 is easy to be penetrated by the light, so the light transmitted from the optical reflecting surface 623*b* is effectively shielded, and the probability of non-imaging light generated between the emitting surface 622 and the light blocking element 630*b* can be reduced.

In detail, the optical axis O of the optical imaging module can travel through the incident surface 621, the emitting surface 622 and the optical reflecting surfaces 623*a*, 623*b*, 623*c* of the light path folding element 620, so that the travelling direction of the optical axis O of the optical imaging module can be changed by the light path folding element 620. Further, the optical reflecting surfaces 623*a*, 623*b*, 623*c* can use the high-reflecting film to reflect the imaging light to provide the mass production of the light path folding element 620; or the optical reflecting surfaces 623*a*, 623*b*, 623*c* also can use the optical total reflection phenomenon to reflect the imaging light to reduce the manufacturing cost; or the light path folding element 620 can have the optical reflecting surfaces 623*a*, 623*b*, 623*c* that using the optical total reflection phenomenon and using the high-reflecting film at the same time. Moreover, a number of the optical reflecting surfaces 623*a*, 623*b*, 623*c* is greater than two, which is suitable for the optical system with longer back focal length. Therefore, the space behind the optical imaging lens assembly 610 can be used more efficiently.

In FIG. 6A, the light blocking element 630*a* is a lens barrel, and the light blocking element 630*b* is a baffle. The incident surface 621, the emitting surface 622 and the optical reflecting surfaces 623*a*, 623*b*, 623*c* of the light path folding element 620 are all the interfaces that are easy to form the stray light. Therefore, the stray light formed in the specific area is shielded by setting the light blocking elements 630*a*, 630*b* corresponding to the light path folding element 620. Further, in the 6th Example, a distance D between the light blocking surface 632*b* and the light path folding element 620 is 0.11 mm, so that the higher assembly efficiency and the feasibility of miniaturization of the optical imaging module can be provided.

Figure 6B:
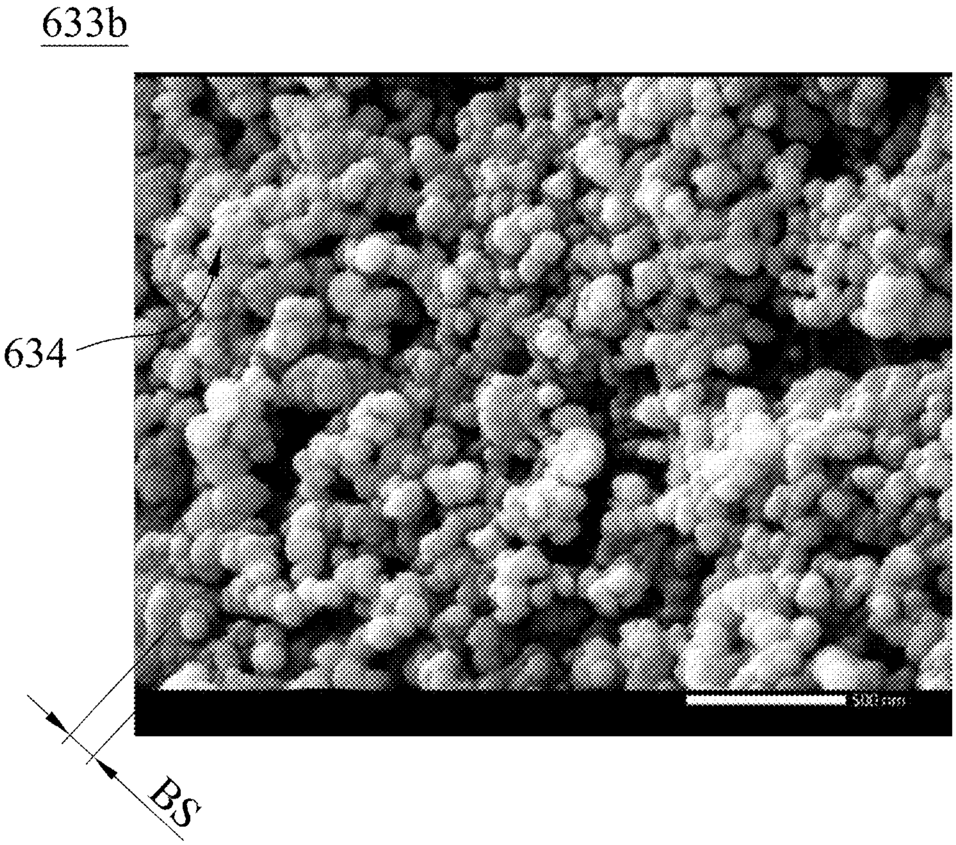
FIG. 6B is a scanning electron microscope image of the anti-reflective light blocking membrane layer according to the 6th Example in FIG. 6A.

FIG. 6B is a scanning electron microscope image of the anti-reflective light blocking membrane layer 633*b* according to the 6th Example in FIG. 6A. In FIG. 6B, the surface of the anti-reflective light blocking membrane layer 633*b* observed by looking down the scanning electron microscope image has a plurality of nanostructures 634, which can provide the high-efficiency light blocking effect. Furthermore, a structural shape of each of the nanostructures 634 is a ball-like protrusion structure, and the nanostructures 634 are arranged in an irregular form, so that the optical diffraction can be avoided to generate, and the actual light path of the imaging light is more in line with the default path. Specifically, the nanostructures 634 are formed by the carbon black layer processed by the specific process. After the nanostructures 634 formed, the coating layer is coated on the outside to protect the structure and provide the higher coating stability. Therefore, the durability and the structural stability of the anti-reflective light blocking membrane layer 633*b* can be enhanced to improve the product yield and reduce the reflectivity of the light blocking surface 632*b*. Furthermore, the nanostructures 634 can also be called the sub-wavelength structures, and the size of the structures can be between 5 nm to 500 nm, which can have the better anti-reflection effect. In detail, in the 6th Example, a size BS of the ball-like protrusion structure of each of the nanostructures 634 is 56.6 nm, so that the plating yield of the nanostructures 634 can be improved and the lower optical reflectance can be taken into account. Moreover, it must be noted that the structural shape of each of the nanostructures of the anti-reflective light blocking membrane layer 633*a* of the light blocking surface 632*a* is also a ball-like protrusion structure, which is the same as the nanostructures 634 of the anti-reflective light blocking membrane layer 633*b*, and will not be described herein.

7th Example

Figure 7A:
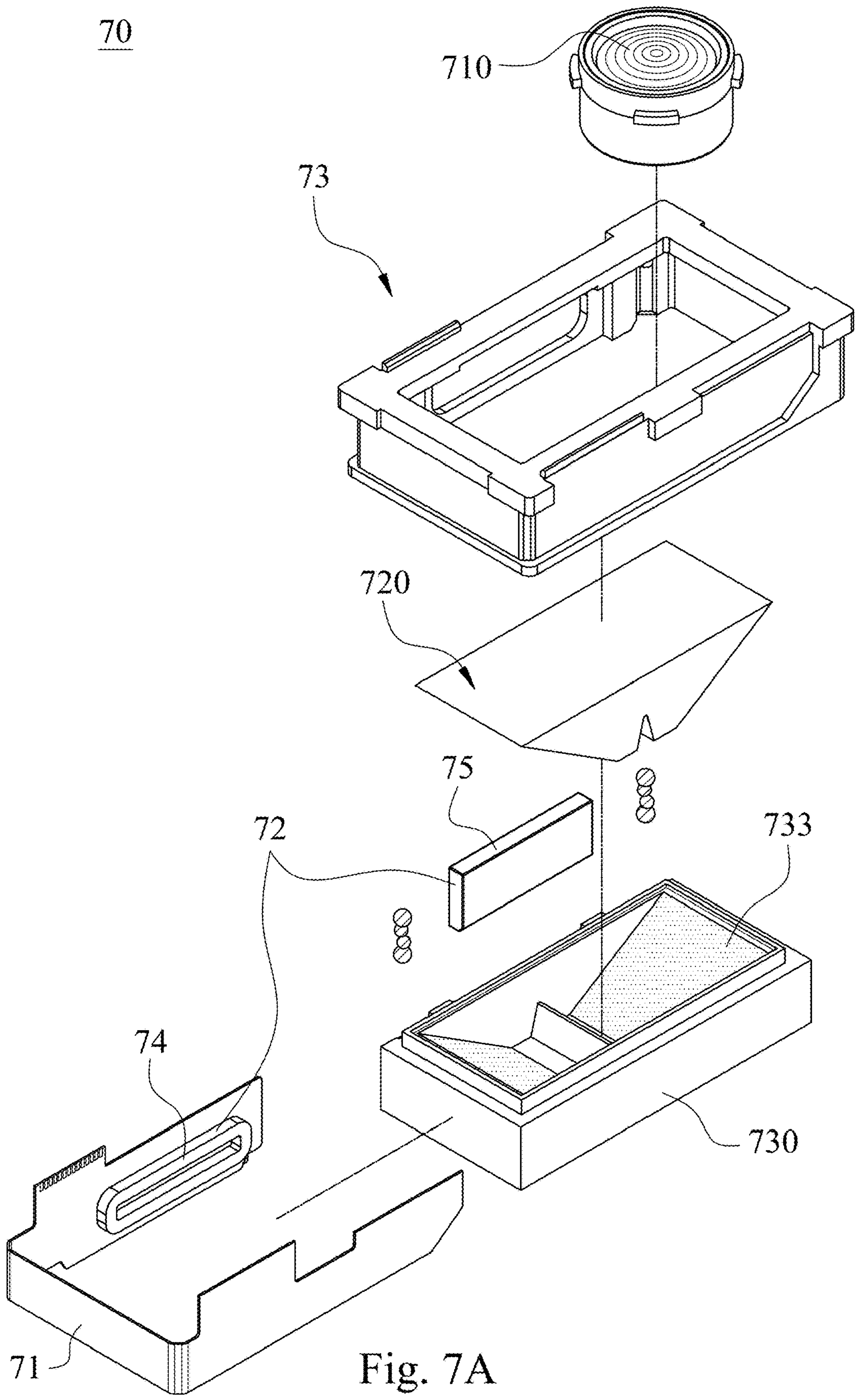
FIG. 7A is an exploded view of a camera module according the 7th Example of the present disclosure.

FIG. 7A is an exploded view of a camera module 70 according the 7th Example of the present disclosure. In FIG. 7A, the camera module 70 includes a housing 71, at least one driving mechanism 72, a fixed frame 73 and an optical imaging module (not shown in drawings). Specifically, the housing 71 is connected to the fixed frame 73, and the optical imaging module is disposed in the fixed frame 73. Furthermore, the driving mechanism 72 can include a coil 74 and a magnet 75, which are used to drive the optical imaging module.

Specifically, the optical imaging module includes an optical imaging lens assembly 710, a light path folding element 720 and a light blocking element 730. The optical imaging lens assembly 710 includes at least one optical lens element (not shown in drawings). The light path folding element 720 has an incident surface (not shown in drawings), an emitting surface (not shown in drawings) and three optical reflecting surfaces (not shown in drawings), and the light path folding element 720 is disposed on an image side of the optical imaging lens assembly 710. The light blocking element 730 is disposed on the light path folding element 720, and the light blocking element 730 includes a light blocking surface (not shown in drawings), and the light blocking surface is disposed toward the light path folding element 720. Further, the light blocking surface has an anti-reflective light blocking membrane layer 733, and the light blocking surface is opposite to the optical reflecting surface of the light path folding element 720. Due to the optical reflecting surface of the light path folding element 720 is easy to be penetrated by the light, so the light transmitted from the optical reflecting surface is effectively shielded.

In detail, the optical reflecting surfaces can use the high-reflecting film to reflect the imaging light to provide the mass production of the light path folding element 720; or the optical reflecting surfaces also can use the optical total reflection phenomenon to reflect the imaging light to reduce the manufacturing cost; or the light path folding element 720 can have the optical reflecting surfaces that using the optical total reflection phenomenon and using the high-reflecting film at the same time. Moreover, a number of the optical reflecting surfaces is greater than two, which is suitable for the optical system with longer back focal length. Therefore, the space behind the optical imaging lens assembly 710 can be used more efficiently.

In FIG. 7A, the light blocking element 730 is a reflective element carrier, and the incident surface, the emitting surface and the optical reflecting surfaces of the light path folding element 720 are all the interfaces that are easy to form the stray light. Therefore, the stray light formed in the specific area is shielded by setting the light blocking element 730 corresponding to the light path folding element 720.

Figure 7B:
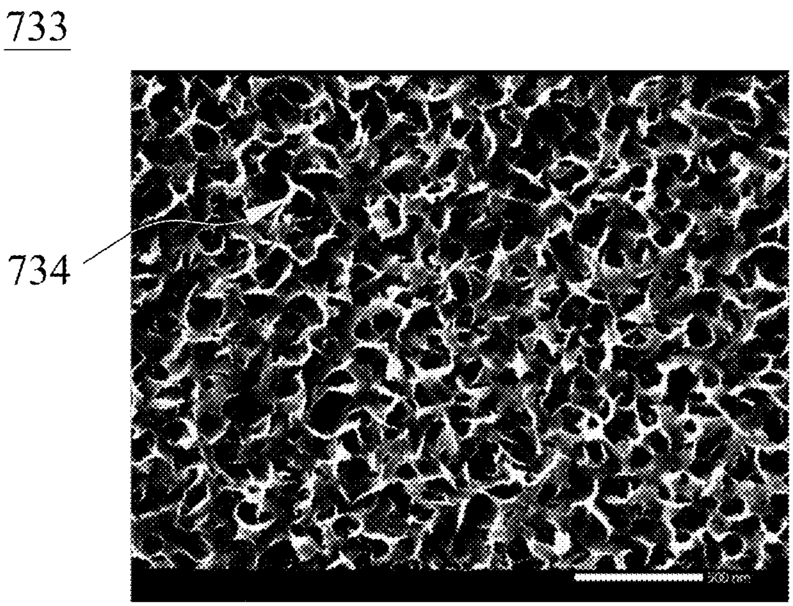
FIG. 7B is a scanning electron microscope image of the anti-reflective light blocking membrane layer according to the 7th Example in FIG. 7A.
Figure 7C:
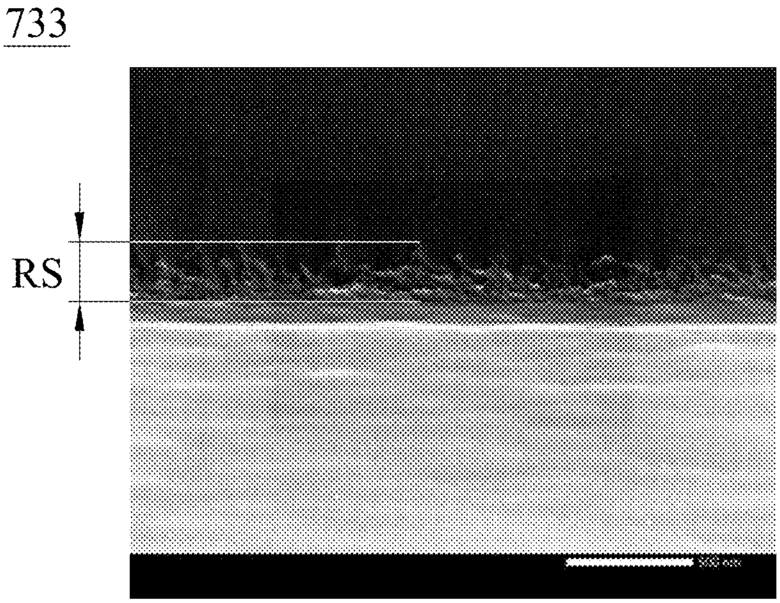
FIG. 7C is a scanning electron microscope image of a cross section of the anti-reflective light blocking membrane layer according to the 7th Example in FIG. 7A.

FIG. 7B is a scanning electron microscope image of the anti-reflective light blocking membrane layer 733 according to the 7th Example in FIG. 7A. FIG. 7C is a scanning electron microscope image of a cross section of the anti-reflective light blocking membrane layer 733 according to the 7th Example in FIG. 7A. In FIG. 7B and FIG. 7C, the surface of the anti-reflective light blocking membrane layer 733 observed by looking down the scanning electron microscope image has a plurality of nanostructures 734, which can provide the high-efficiency light blocking effect. Furthermore, a structural shape of each of the nanostructures 734 is a ridge-like protrusion structure, and the nanostructures 734 are arranged in an irregular form, so that the optical diffraction can be avoided to generate, and the actual light path of the imaging light is more in line with the default path. Specifically, the nanostructures 734 are formed by depositing aluminum oxide processed by the specific process, and when observed from the cross section, the structures formed like the ridge which are wide bottom and narrow top. Therefore, the equivalent refractive index of the anti-reflective light blocking membrane layer 733 can be reduced gradually from the bottom to the top of the nanostructures 734, so that the reflectivity of the light blocking surface is reduced. Furthermore, the nanostructures 734 can also be called the sub-wavelength structures, and the size of the structures can be between 5 nm to 500 nm, which can have the better anti-reflection effect. In detail, in the 7th Example, a size RS of the ridge-like protrusion structure of each of the nanostructures 734 is 218.0 nm, so that the nanostructures 734 can be distributed more uniformly to provide the higher coating quality.

8th Example

Figure 8A:
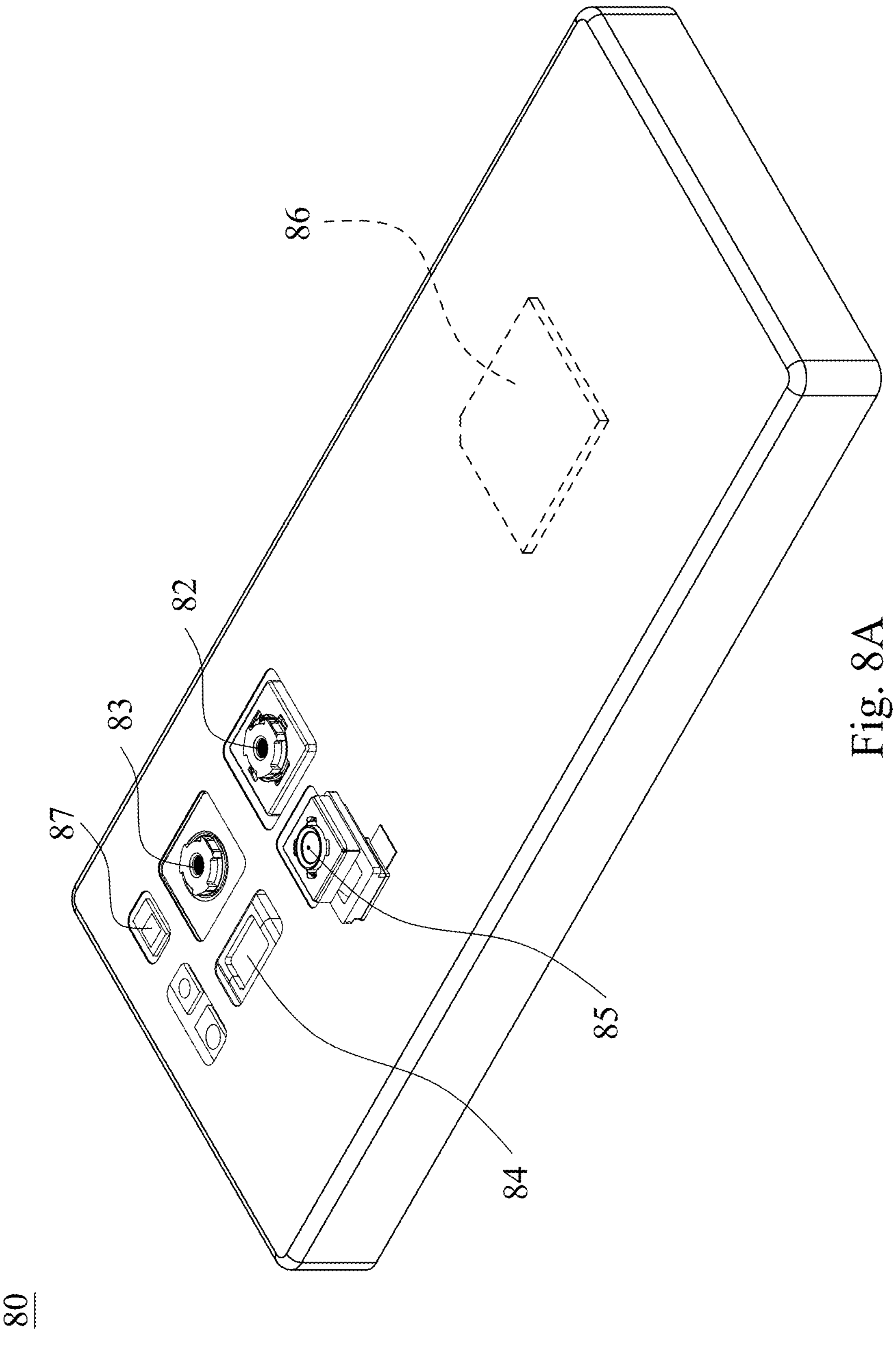
FIG. 8A is a schematic view of an electronic device according to the 8th Example of the present disclosure.
Figure 8B:
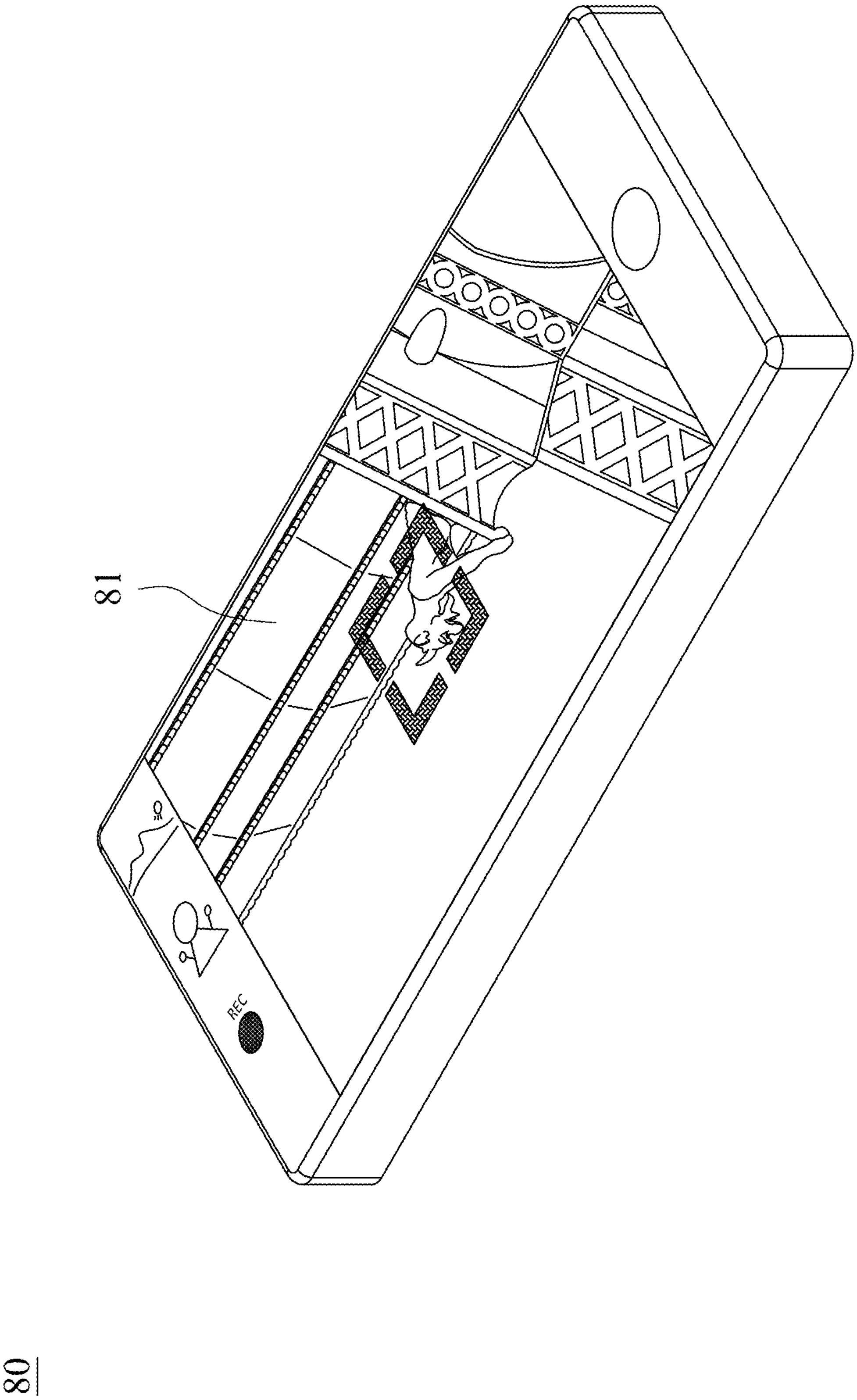
FIG. 8B is another schematic view of the electronic device according to the 8th Example in FIG. 8A.

FIG. 8A is a schematic view of an electronic device 80 according to the 8th Example of the present disclosure. FIG. 8B is another schematic view of the electronic device 80 according to the 8th Example in FIG. 8A. In FIGS. 8A and 8B, the electronic device 80 is a smart phone, and includes a camera module (not shown in drawings) and a user interface 81. The camera module includes an optical imaging module (not shown in drawings) and an image sensor (not shown in drawings), wherein the image sensor is disposed on an image surface (not shown in drawings) of the optical imaging module. Furthermore, the camera module includes an ultra-wide angle camera module 82, a high resolution camera module 83 and telephoto camera modules 84, 85, and the user interface 81 is a touch screen, which is not limited thereto. Moreover, the optical imaging module can be one of the optical imaging modules according to the aforementioned the 1 st Example to the 7th Example, but the present disclosure is not limited thereto.

Furthermore, users enter a shooting mode via the user interface 81, wherein the user interface 81 is for displaying the scene, and the shooting angle can be manually adjusted to switch the different camera modules. At this moment, the imaging light is gathered on the image sensor via the optical imaging module of the camera module, and an electronic signal about an image is output to an image signal processor (ISP) 86.

In FIG. 8A, to meet a specification of the electronic device 80, the electronic device 80 can further include an optical anti-shake mechanism (not shown in drawings). Furthermore, the electronic device 80 can further include at least one focusing assisting module (not shown in drawings) and at least one sensing element (not shown in drawings). The focusing assisting module can be a flash module 87 for compensating a color temperature, an infrared distance measurement component, a laser focus module, etc. The sensing element can have functions for sensing physical momentum and kinetic energy, such as an accelerator, a gyroscope, a Hall Effect Element, to sense shaking or jitters applied by hands of the user or external environments. Accordingly, the electronic device 80 equipped with an auto-focusing mechanism and the optical anti-shake mechanism can be enhanced to achieve the superior image quality. Furthermore, the electronic device 80 according to the present disclosure can have a capturing function with multiple modes, such as taking optimized selfies, high dynamic range (HDR) under a low light condition, 4K resolution recording, etc. Furthermore, the users can visually see a captured image of the camera through the user interface 81 and manually operate the view finding range on the user interface 81 to achieve the auto-focus function of what you see is what you get.

Moreover, the camera module, the optical anti-shake mechanism, the sensing element and the focusing assisting module can be disposed on a flexible printed circuit board (FPC) (not shown in drawings) and electrically connected to the associated components, such as the image signal processor 86, via a connector (not shown in drawings) to perform a capturing process. Since the current electronic devices, such as smart phones, have a tendency of being compact, the way of firstly disposing the camera module and related components on the flexible printed circuit board and secondly integrating the circuit thereof into the main board of the electronic device via the connector can satisfy the requirements of the mechanical design and the circuit layout of the limited space inside the electronic device, and obtain more margins. The autofocus function of the camera module can also be controlled more flexibly via the touch screen of the electronic device. According to the 8th Example, the electronic device 80 can include a plurality of sensing elements and a plurality of focusing assisting modules. The sensing elements and the focusing assisting modules are disposed on the flexible printed circuit board and at least one other flexible printed circuit board (not shown in drawings) and electrically connected to the associated components, such as the image signal processor 86, via corresponding connectors to perform the capturing process. In other examples (not shown in drawings), the sensing elements and the focusing assisting modules can also be disposed on the main board of the electronic device or carrier boards of other types according to requirements of the mechanical design and the circuit layout.

Furthermore, the electronic device 80 can further include, but not be limited to, a display, a control unit, a storage unit, a random access memory (RAM), a read-only memory (ROM), or the combination thereof.

Figure 8C:
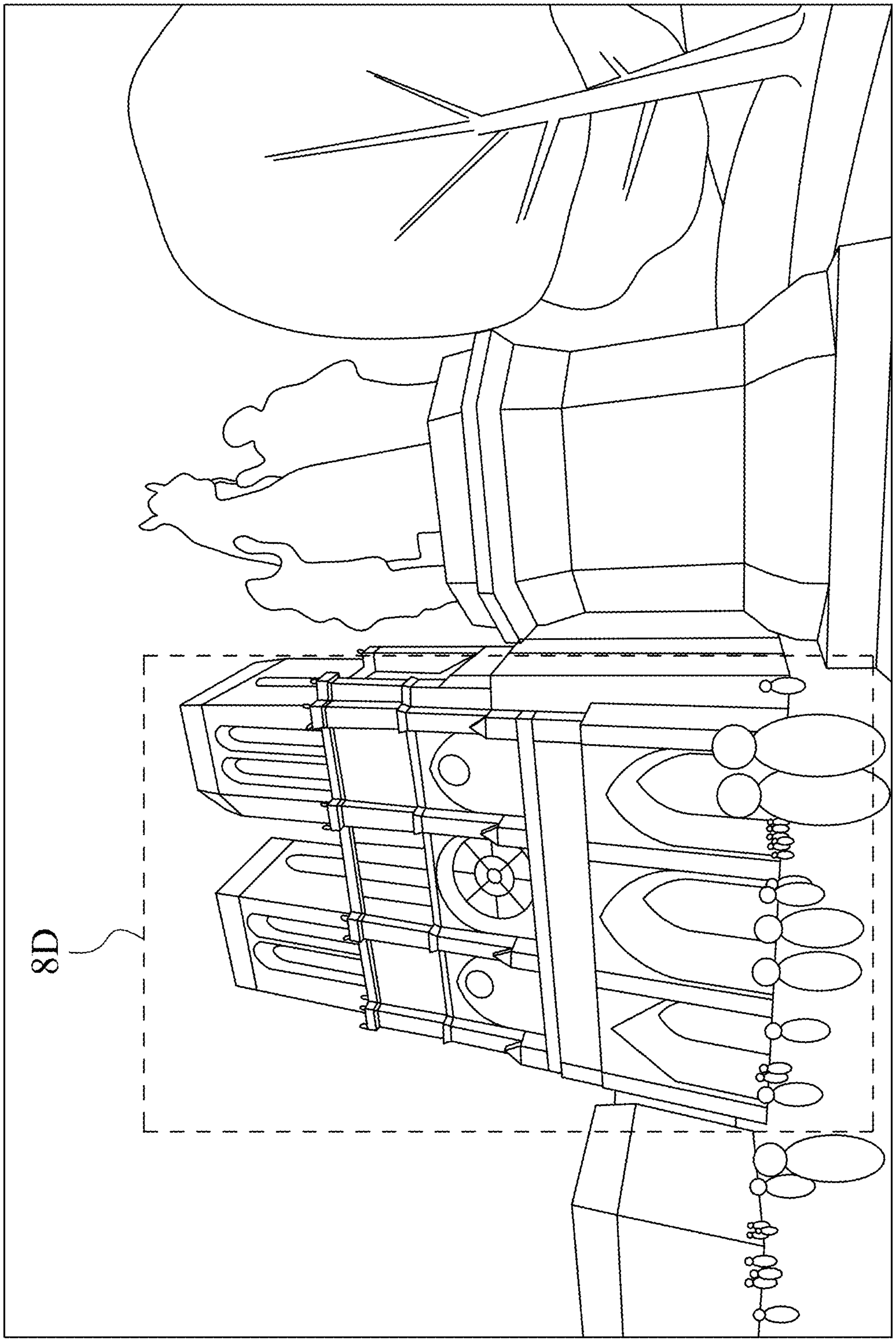
FIG. 8C is a schematic view of an image captured by the ultra-wide angle camera module of the electronic device according to the 8th Example in FIG. 8A.

FIG. 8C is a schematic view of an image captured by the ultra-wide angle camera module 82 of the electronic device

80 according to the 8th Example in FIG. 8A. In FIG. 8C, the larger range of the image can be captured via the ultra-wide angle camera module 82, and the ultra-wide angle camera module 82 can have the function of accommodating more wide range of the scene.

Figure 8D:
FIG. 8D is a schematic view of an image captured by the high resolution camera module of the electronic device according to the 8th Example in FIG. 8A.

FIG. 8D is a schematic view of an image captured by the high resolution camera module 83 of the electronic device 80 according to the 8th Example in FIG. 8A. In FIG. 8D, the image of the certain range with the high resolution can be captured via the high resolution camera module 83, and the high resolution camera module 83 has the function of the high resolution and the low deformation.

Figure 8E:
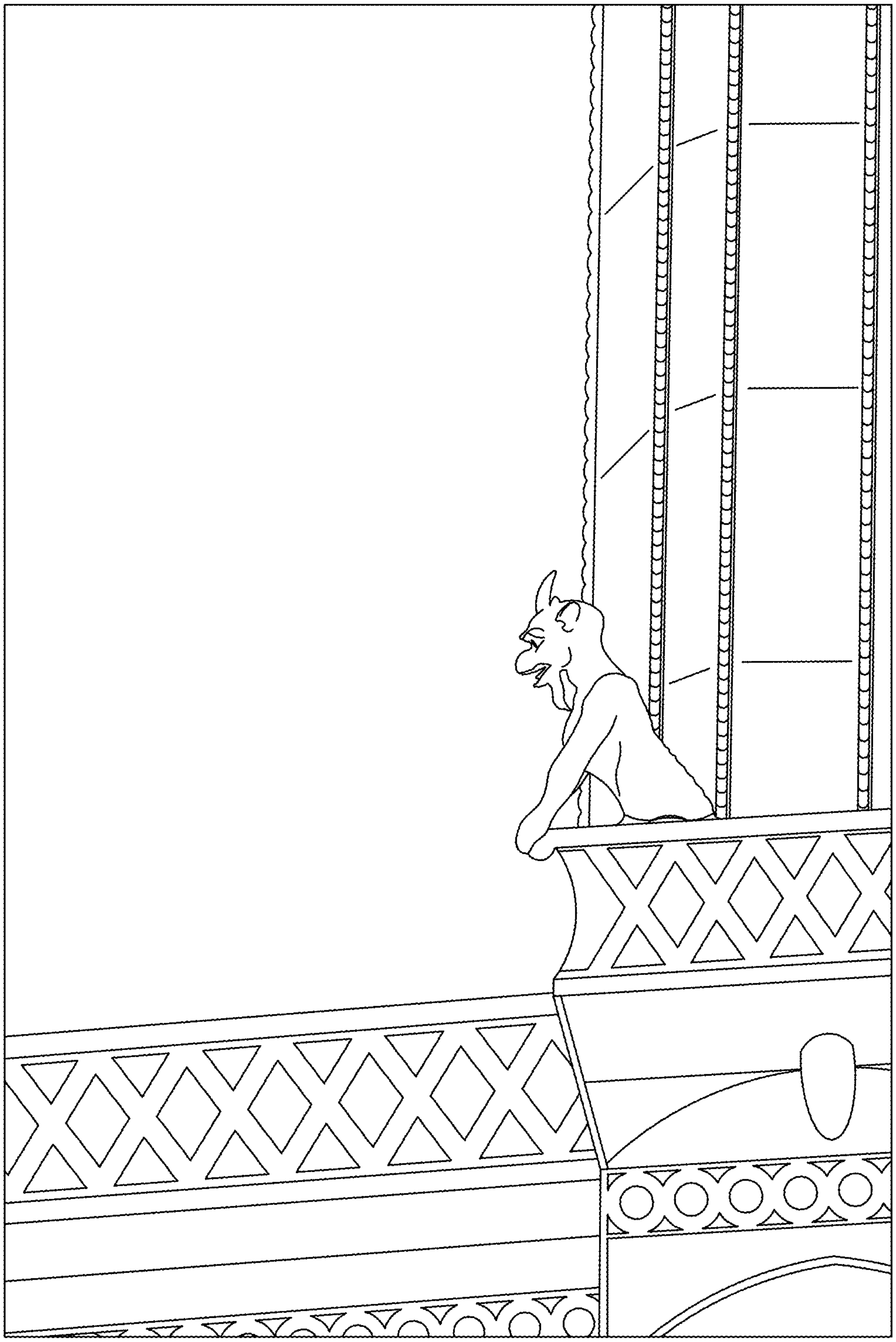
FIG. 8E is a schematic view of an image captured by the telephoto camera modules of the electronic device according to the 8th Example in FIG. 8A.

FIG. 8E is a schematic view of an image captured by the telephoto camera modules 84, 85 of the electronic device 80 according to the 8th Example in FIG. 8A. In FIG. 8E, the telephoto camera modules 84, 85 have the enlarging function of the high magnification, and the distant image can be captured and enlarged with high magnification via the telephoto camera modules 84, 85.

In FIGS. 8C to 8E, the zooming function can be obtained via the electronic device 80, when the scene is captured via the camera module with different focal lengths cooperated with the function of image processing.

9th Example

Figure 9:
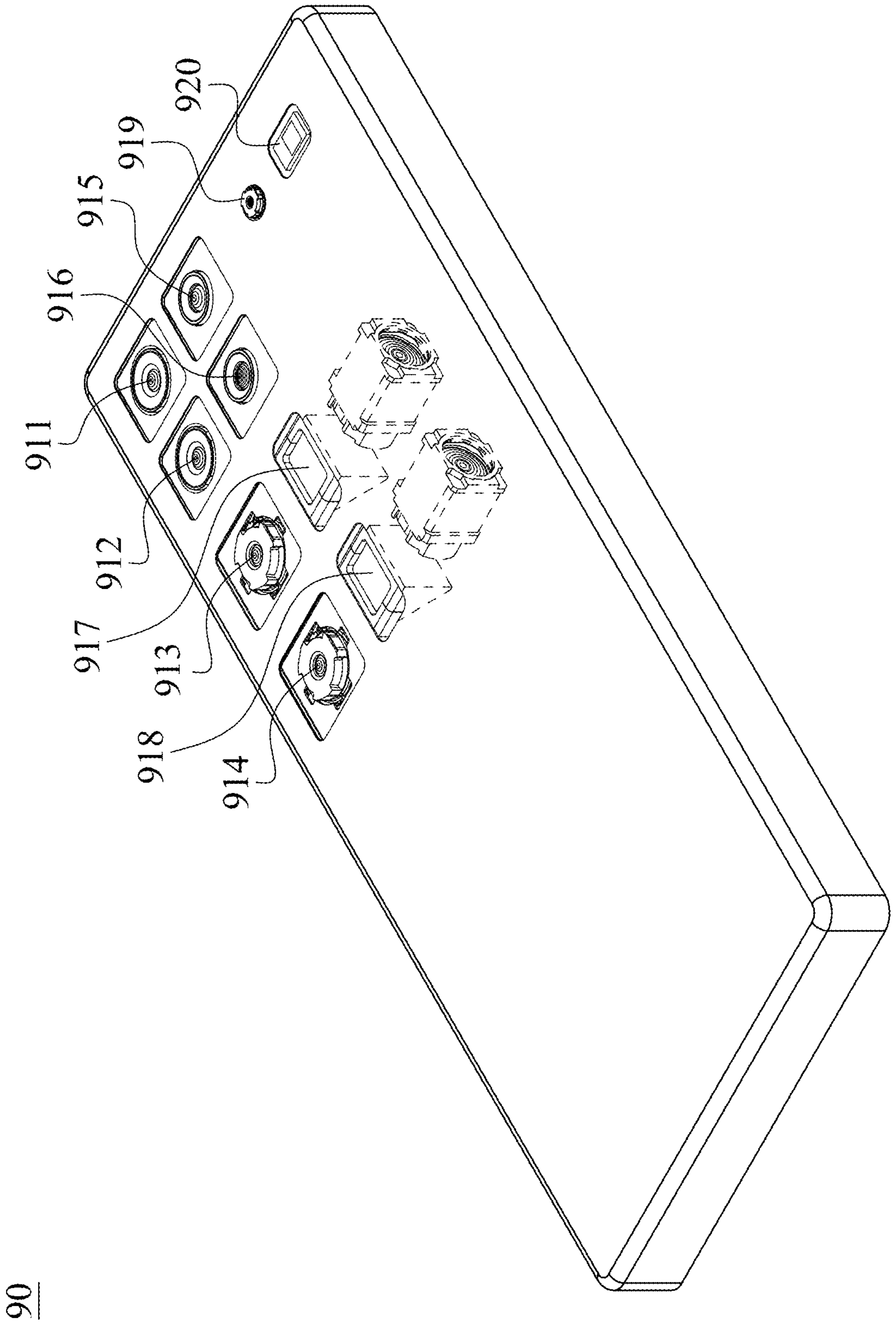
FIG. 9 is a schematic view of an electronic device according to the 9th Example of the present disclosure.

FIG. 9 is a schematic view of an electronic device 90 according to the 9th Example of the present disclosure. In FIG. 9, the electronic device 90 is a smart phone, and includes a camera module (not shown in drawings). The camera module includes an optical imaging module (not shown in drawings) and an image sensor (not shown in drawings), wherein the image sensor is disposed on an image surface (not shown in drawings) of the optical imaging module. Furthermore, the camera module includes ultra-wide angle camera modules 911, 912, wide angle camera modules 913, 914, telephoto camera modules 915, 916, 917, 918, and a Time-Of-Flight (TOF) module 919. The TOF module 919 can be another type of the camera module, and the disposition is not limited thereto. In detail, the optical imaging module can be one of the optical imaging modules according to the aforementioned the 1st Example to the 7th Example, but the present disclosure is not limited thereto.

Further, the telephoto camera modules 917, 918 are configured to fold the light, but the present disclosure is not limited thereto.

To meet a specification of the electronic device 90, the electronic device 90 can further include an optical anti-shake mechanism (not shown in drawings). Furthermore, the electronic device 90 can further include at least one focusing assisting module (not shown in drawings) and at least one sensing element (not shown in drawings). The focusing assisting module can be a flash module 920 for compensating a color temperature, an infrared distance measurement component, a laser focus module, etc. The sensing element can have functions for sensing physical momentum and kinetic energy, such as an accelerator, a gyroscope, a Hall Effect Element, to sense shaking or jitters applied by hands of the user or external environments. Accordingly, the electronic device 90 equipped with an auto-focusing mechanism and the optical anti-shake mechanism can be enhanced to achieve the superior image quality. Furthermore, the electronic device 90 according to the present disclosure can have a capturing function with multiple modes, such as taking optimized selfies, High Dynamic Range (HDR) under a low light condition, 4K Resolution recording, etc.

Further, all of other structures and dispositions according to the 9th Example are the same as the structures and the dispositions according to the 8th Example, and will not be described again herein.

10th Example

Figure 10A:
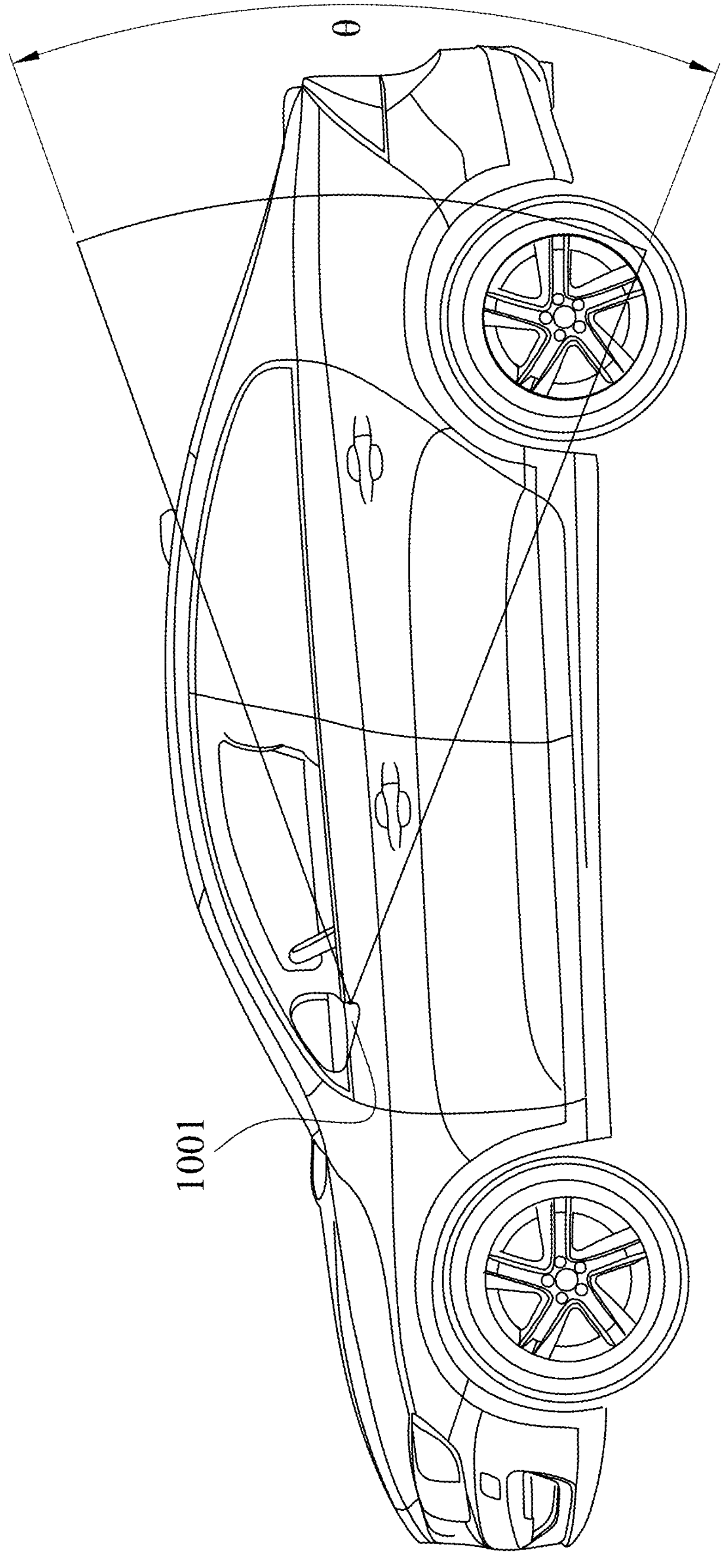
FIG. 10A shows a schematic view of a vehicle device according to the 10th Example of the present disclosure.
Figure 10B:
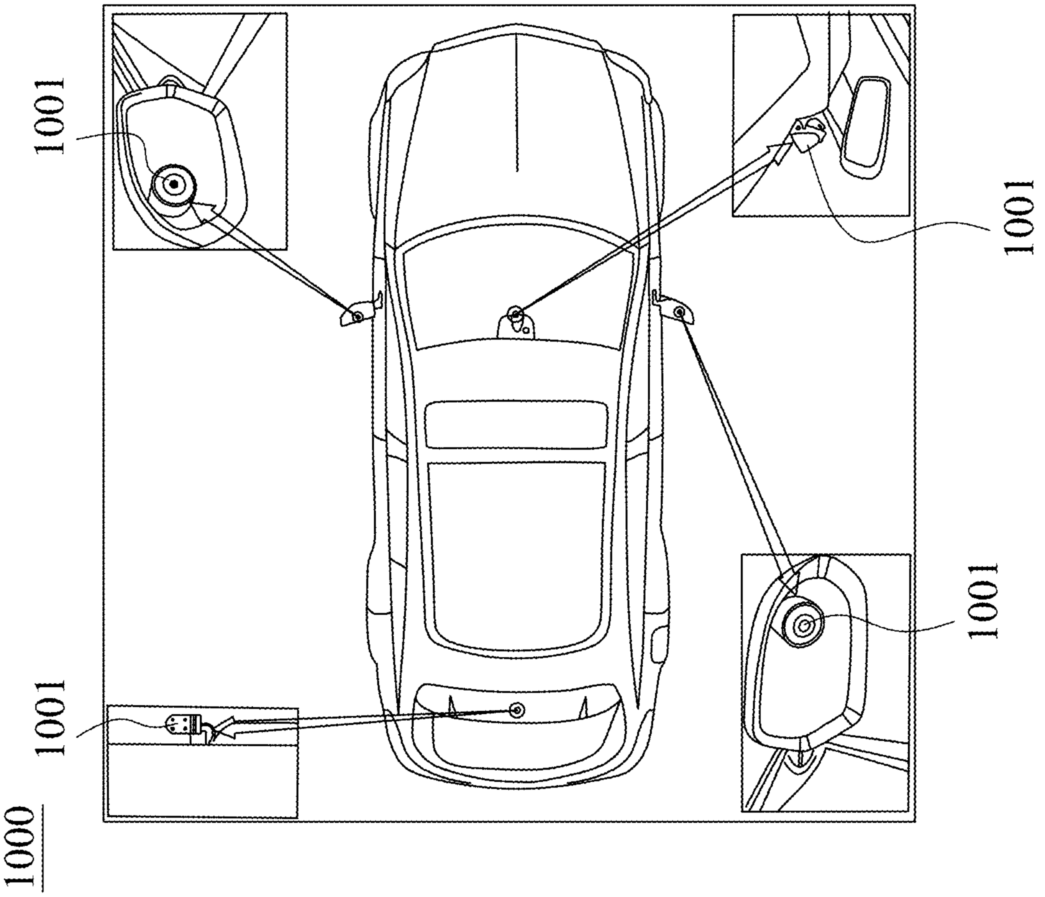
FIG. 10B shows another schematic view of the vehicle device according to the 10th Example in FIG. 10A.
Figure 10C:
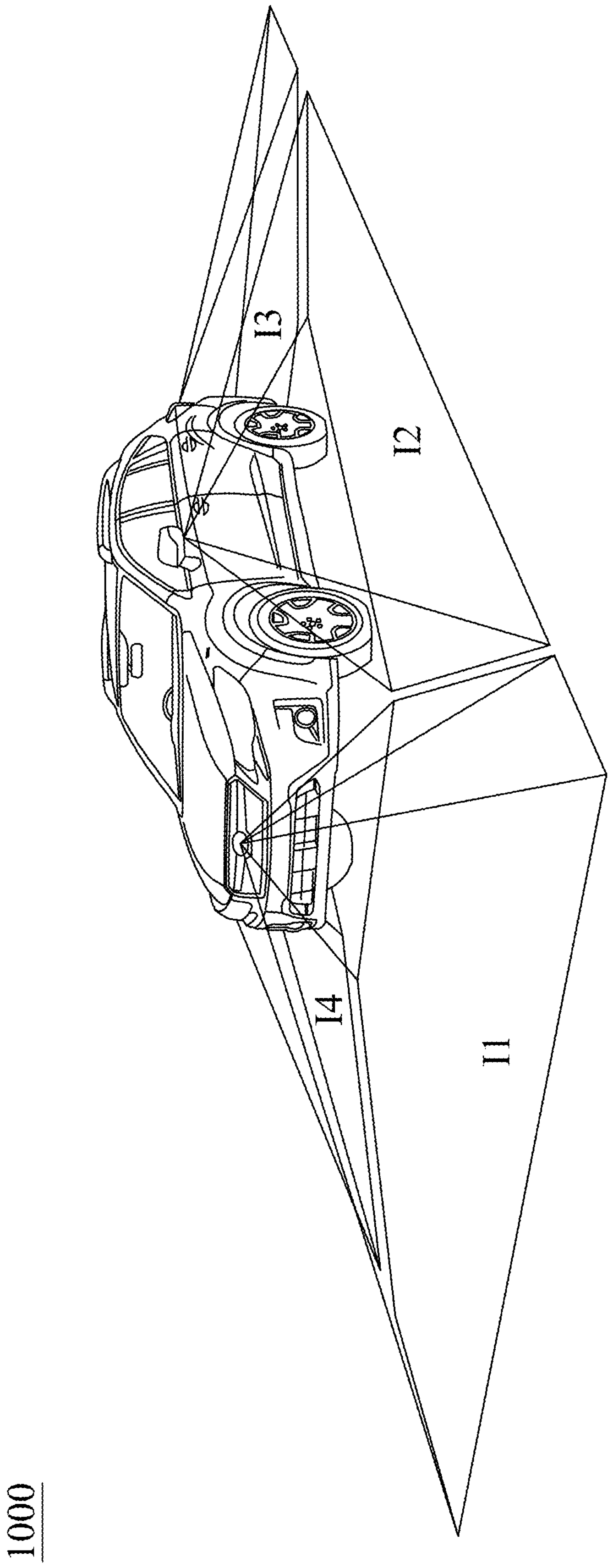
FIG. 10C shows further another schematic view of the vehicle device according to the 10th Example in FIG. 10A.

FIG. 10A shows a schematic view of a vehicle device 1000 according to the 10th Example of the present disclosure. FIG. 10B shows another schematic view of the vehicle device 1000 according to the 10th Example in FIG. 10A. FIG. 10C shows further another schematic view of the vehicle device 1000 according to the 10th Example in FIG. 10A. In FIG. 10A to FIG. 10C, the vehicle device 1000 includes a plurality of camera modules 1001. Each of the camera modules 1001 can include an optical imaging module (not shown in drawings) and an image sensor (not shown in drawings), the image sensor is disposed on an image surface (not shown in drawings) of the optical imaging module. In the 10th Example, a number of the camera modules 1001 is six, and the optical imaging module can be one of the optical imaging modules according to the aforementioned the 1st Example to the 7th Example, but the present disclosure is not limited thereto.

In FIG. 10A to FIG. 10B, the camera module 1001 is a vehicle camera module, and two of the camera modules 1001 are located under two rear view mirrors on the left side and the right side, respectively. Each of the two camera modules 1001 captures image information from a field of view 0. Specifically, the field of view 0 can satisfy the following condition: 40 degrees<0<90 degrees. Hence, the image information in the region of two lanes on the left side and the right side can be captured.

In FIG. 10B, another two of the camera modules 1001 can be disposed in an inner space of the vehicle device 1000. Specifically, the aforementioned two camera modules 1001 can be disposed near a rear view mirror in the vehicle device 1000 and near a rear window, respectively, or can be disposed on non-mirror surfaces of two rear view mirrors on left side and right side of the vehicle device 1000, respectively, but not limited thereto. Therefore, it is favorable for the user obtaining the external space information out of the driving seat, and the angle of view can be provided widely to decrease the blind spot, which is favorable for improving driving safety.

In FIG. 10C, further another two of the camera modules 1001 can be disposed at the front end and the rear end of the vehicle device 1000. Furthermore, the traffic information outside the vehicle can be identified helpfully by the arrangement of the camera modules 1001 disposed at the front end, the rear end and below the left and right rear view mirrors of the vehicle device 1000. The traffic information outside the vehicle can be 11, 12, 13, 14, but not limited thereto. Therefore, it is helpful to achieve the function of autopilot.

The foregoing description, for purpose of explanation, has been described with reference to specific embodiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. An optical imaging module, comprising:

an optical imaging lens assembly comprising at least one optical lens element;

a light path folding element having an incident surface, an emitting surface and at least one optical reflecting surface, and the light path folding element disposed on an image side of the optical imaging lens assembly; and a light blocking element disposed on one of the at least one optical lens element and the light path folding element, and the light blocking element comprising:

an opening hole corresponded to one of the incident surface and the emitting surface of the light path folding element; and a light blocking surface adjacent to the opening hole, the light blocking surface comprising an anti-reflective structure surrounding the opening hole, the anti-reflective structure having a rugged surface, and an anti-reflective light blocking membrane layer disposed on the anti-reflective structure;

wherein the light blocking surface is opposite to at least one of the incident surface, the emitting surface and the at least one optical reflecting surface of the light path folding element;

wherein a distance between the light blocking surface and the light path folding element is D, and the following condition is satisfied:

$$0 \text{ mm} < D < 1.8 \text{ mm}.$$

2. The optical imaging module of claim 1, wherein the light blocking surface is opposite to the incident surface of the light path folding element.

3. The optical imaging module of claim 1, wherein the light blocking surface is opposite to the at least one optical reflecting surface of the light path folding element.

4. The optical imaging module of claim 3, wherein the at least one optical reflecting surface of the light path folding element reflects an imaging light by an optical total reflection phenomenon.

5. The optical imaging module of claim 3, wherein the at least one optical reflecting surface of the light path folding element reflects an imaging light by a high-reflecting film.

6. The optical imaging module of claim 1, wherein a cross section of the anti-reflective structure is in a zigzag form.

7. The optical imaging module of claim 1, wherein the light blocking element is disposed between the optical lens element and the light path folding element.

8. The optical imaging module of claim 1, wherein the anti-reflective light blocking membrane layer comprises a carbon black material.

9. The optical imaging module of claim 1, wherein the anti-reflective light blocking membrane layer comprises an optical thin film material.

10. The optical imaging module of claim 1, wherein the anti-reflective light blocking membrane layer comprises an aluminum oxide material.

11. The optical imaging module of claim 1, wherein a number of the at least one optical reflecting surface of the light path folding element is greater than or equal to two.

12. The optical imaging module of claim 1, wherein the opening hole of the light blocking element is a non-circular opening hole.

13. The optical imaging module of claim 1, wherein the distance between the light blocking surface and the light path folding element is D, and the following condition is satisfied:

$$0 \text{ mm} < D < 1.2 \text{ mm}.$$

14. A camera module, comprising:

the optical imaging module of claim 1; and an image sensor.

15. An electronic device, comprising:

the camera module of claim 14.

* * * * *